US010623805B2

(12) United States Patent
Nakajima

(10) Patent No.: US 10,623,805 B2
(45) Date of Patent: Apr. 14, 2020

(54) SENDING DEVICE, METHOD OF SENDING HIGH DYNAMIC RANGE IMAGE DATA, RECEIVING DEVICE, AND METHOD OF RECEIVING HIGH DYNAMIC RANGE IMAGE DATA

(71) Applicant: SONY CORPORATION, Tokyo (JP)

(72) Inventor: Yasuhisa Nakajima, Kanagawa (JP)

(73) Assignee: SONY CORPORATION, Tokyo (JP)

(*) Notice: Subject to any disclaimer, the term of this patent is extended or adjusted under 35 U.S.C. 154(b) by 100 days.

(21) Appl. No.: 15/523,398

(22) PCT Filed: Nov. 9, 2015

(86) PCT No.: PCT/JP2015/081516
§ 371 (c)(1),
(2) Date: Apr. 30, 2017

(87) PCT Pub. No.: WO2016/080233
PCT Pub. Date: May 26, 2016

(65) Prior Publication Data
US 2017/0311031 A1 Oct. 26, 2017

(30) Foreign Application Priority Data
Nov. 17, 2014 (JP) .................................. 2014-232414

(51) Int. Cl.
H04N 21/436 (2011.01)
H04N 19/98 (2014.01)
(Continued)

(52) U.S. Cl.
CPC .......... H04N 21/436 (2013.01); G09G 5/006 (2013.01); G09G 5/02 (2013.01); G09G 5/10 (2013.01);
(Continued)

(58) Field of Classification Search
CPC ..................................................... H04N 21/436
(Continued)

(56) References Cited

U.S. PATENT DOCUMENTS

2006/0285149 A1* 12/2006 Dei ........................ H04L 1/0009
358/1.15
2010/0073574 A1* 3/2010 Nakajima .................. G06F 3/14
348/723
(Continued)

FOREIGN PATENT DOCUMENTS

JP 2005-352482 A 12/2005
JP 2009-089209 A 4/2009
(Continued)

OTHER PUBLICATIONS

Office Action for JP Patent Application No. 2016-560154, dated Jul. 23, 2019, 06 pages of Office Action and 05 pages of English Translation.

Primary Examiner — Jefferey F Harold
Assistant Examiner — Justin B Sanders
(74) Attorney, Agent, or Firm — Chip Law Group

(57) ABSTRACT

HDR image data are successfully transmitted between devices. High dynamic range image data are sent to an external device. Transmission scheme information and/or gamma correction information for the high dynamic range image data are sent to the external device. The external device can easily understand, for example, what kind of transmission scheme and what kind of gamma correction scheme are used for the sent high dynamic range image data. Therefore, the high dynamic range image data can be successfully transmitted.

19 Claims, 28 Drawing Sheets

(51) Int. Cl.
*G09G 5/36* (2006.01)
*H04N 21/4363* (2011.01)
*G09G 5/10* (2006.01)
*G09G 5/00* (2006.01)
*G09G 5/02* (2006.01)
*H04N 9/64* (2006.01)
*G09G 3/00* (2006.01)

(52) U.S. Cl.
CPC ................ *G09G 5/36* (2013.01); *H04N 9/64* (2013.01); *H04N 19/98* (2014.11); *H04N 21/43635* (2013.01); *G09G 3/003* (2013.01); *G09G 2320/0271* (2013.01); *G09G 2320/0673* (2013.01); *G09G 2340/06* (2013.01); *G09G 2370/04* (2013.01); *G09G 2370/10* (2013.01); *G09G 2370/12* (2013.01)

(58) Field of Classification Search
USPC ........................................................ 348/554
See application file for complete search history.

(56) References Cited

U.S. PATENT DOCUMENTS

| | | | |
|---|---|---|---|
| 2013/0235072 A1* | 9/2013 | Longhurst | H04N 1/46 |
| | | | 345/605 |
| 2014/0079113 A1* | 3/2014 | Newton | G09G 5/006 |
| | | | 375/240.01 |

FOREIGN PATENT DOCUMENTS

| | | | | |
|---|---|---|---|---|
| JP | 2009-253789 A | 10/2009 | | |
| JP | 2011-146894 A | 7/2011 | | |
| JP | 2012-520050 A | 8/2012 | | |
| JP | 2013-090113 A | 5/2013 | | |
| JP | 2014-519620 A | 8/2014 | | |
| JP | 6479656 B2 | 3/2019 | | |
| WO | 2012/153224 A1 | 11/2012 | | |
| WO | WO 2012153224 A1 * | 11/2012 | | G09G 5/006 |
| WO | 2014/178286 A1 | 11/2014 | | |

* cited by examiner

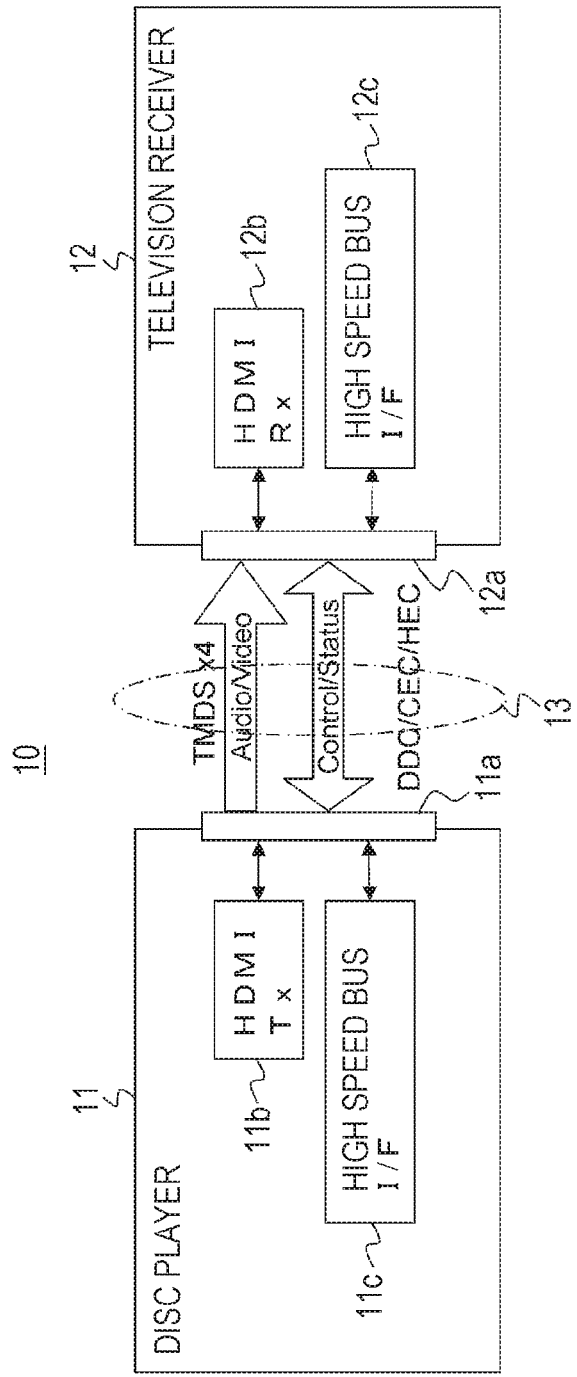

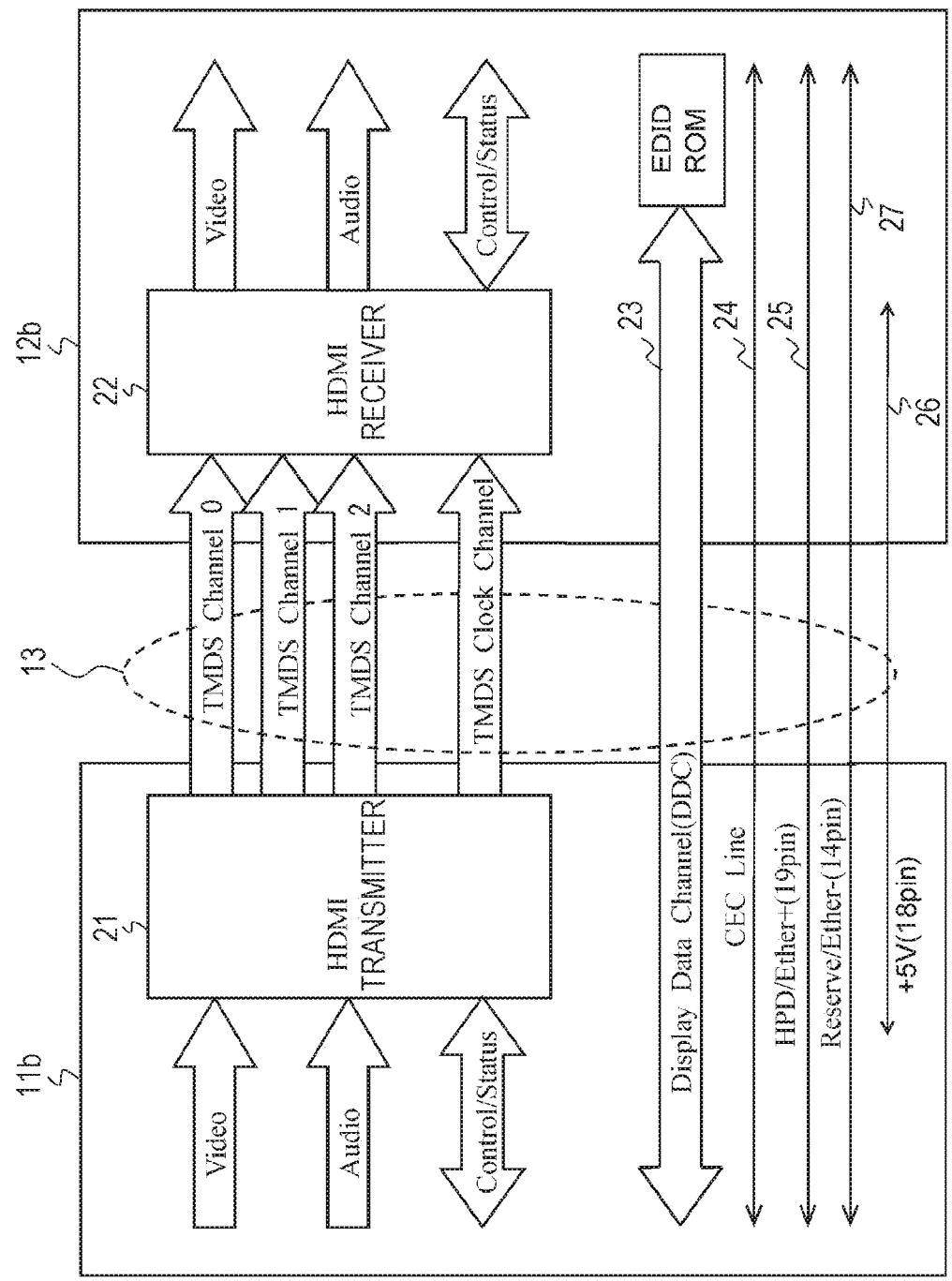

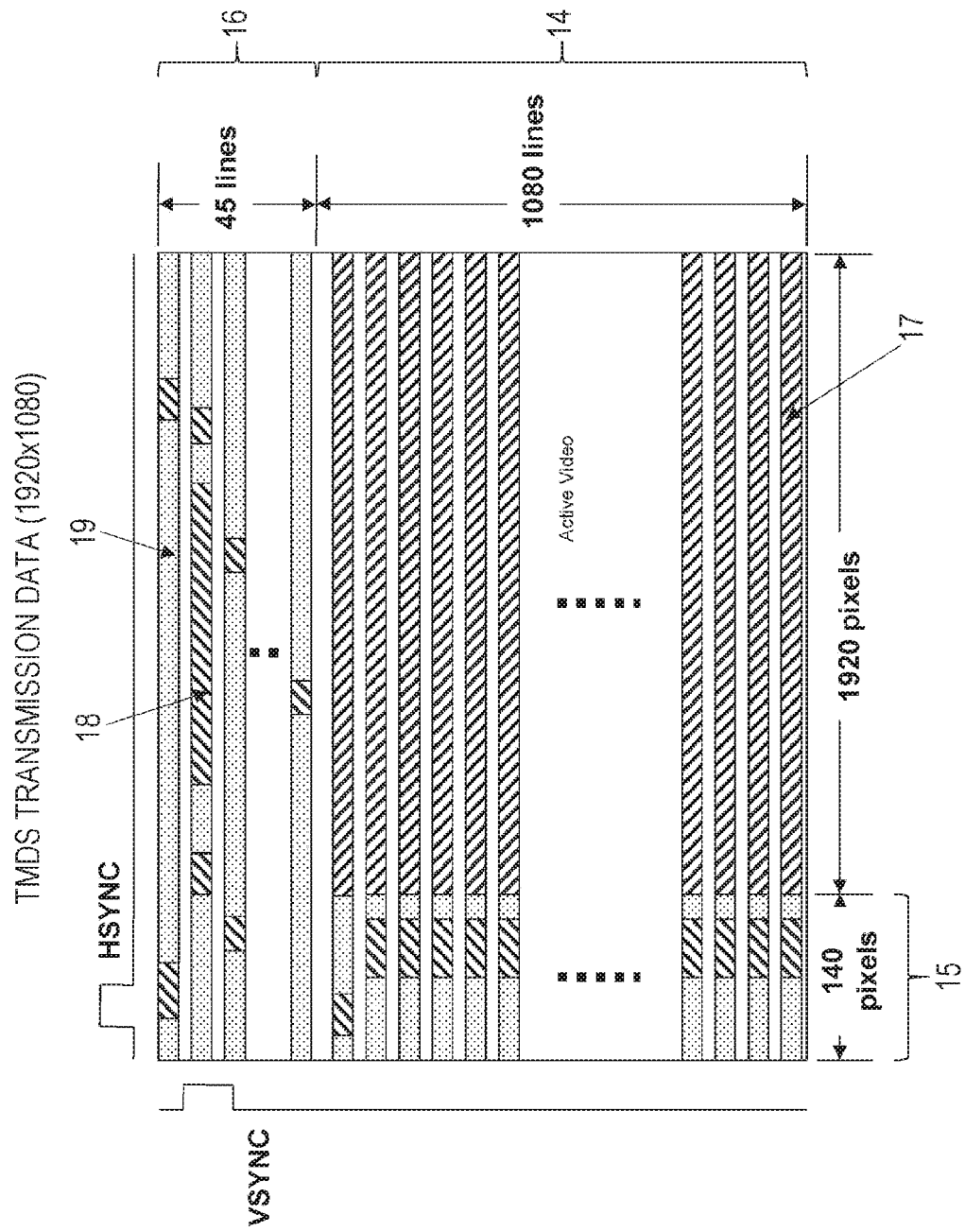

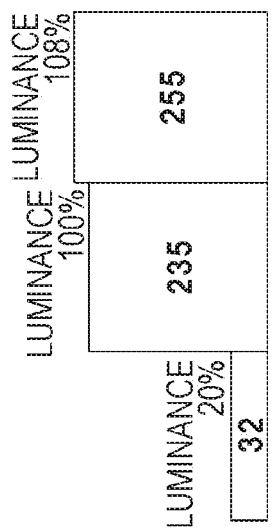
FIG. 4(b)
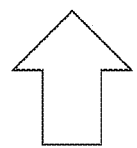
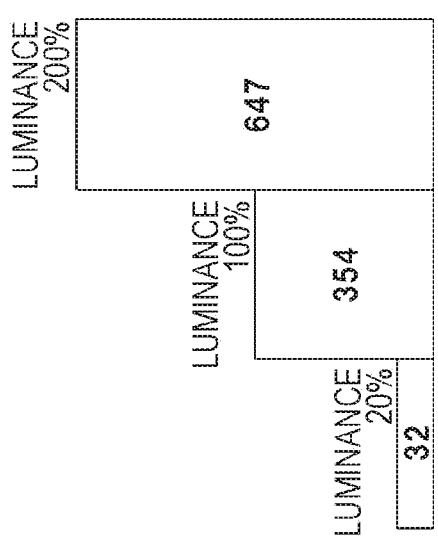
FIG. 4(a)

FIG. 12

$$L = a(max[(V + b), 0])^\gamma$$

$$a = (Lw^{1/\gamma} - Lb^{1/\gamma})^\gamma$$

$$b = Lb^{1/\gamma} / (Lw^{1/\gamma} - Lb^{1/\gamma})$$

Lw: Screen_Luminance_white_Level : LUMINANCE FOR 100% IMAGE LUMINANCE (cd/m²)
Lb: Screen_Luminance_Black_Level: LUMINANCE FOR 0% IMAGE LUMINANCE (cd/m²)
γ: Gamat_Value : GAMMA VALUE
V: IMAGE LEVEL
L: IMAGE LUMINANCE FIG. 15    EXEMPLARY HDR INFORMATION STRUCTURE OF Vendor Specific Data Block

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | Reserved (0) | DVI_Dual |
| 7 | Max_TMDS_Clock | | | | | | | |
| 8 | Latency_Fields_Present | I_Latency_Fields_Present | HDMI_Video_Present | HDR Extension | CNC3 | CNC2 | CNC1 | CNC0 |
| (9) | Video_Latency | | | | | | | |
| (10) | Audio_Latency | | | | | | | |
| (11) | Interlaced_Video_Latency | | | | | | | |
| (12) | Interlaced_Audio_Latency | | | | | | | |
| (13) | 3D_Present | | | Reserved (0) | | | | |
| (14) | HDMI_VIC_LEN | | | HDMI_3D_LEN | | | | |
| (15) | (If HDMI_VIC_LEN>0) HDMI_VIC_1 | | | | | | | |
| ... | | | | | | | | |
| (15+M-1) | HDMI_VIC_M | | | | | | | |
| 15+M | Raw | HDR_DC | HDR_FP | HDR_HFR | Reserved (0) | | | |
| 16+M | HDR1 | HDR2 | HDR3 | HDR4 | Reserved (0) | | | |
| 17+M | VSIF | AVIF | DRIF | Reserved (0) | | | | |
| 18+M | Maximum_Panel_Brightness (cd/m2) | | | | | | | |
| 19+M | Maximum_Extended_Range (%) | | | | | | | |
| 20+M...N | Reserved (0) | | | | | | | |

FIG. 16

EXEMPLARY HDR INFORMATION STRUCTURE OF Video Capability Data Block

| Byte# | 7 | 6 | 5 | 4 | 3 | 2 | 1 | 0 |
|---|---|---|---|---|---|---|---|---|
| 0 | Tag code (=7) | | | | | Length (=N) | | |
| 1 | Extended Tag Code (=0) | | | | | | | |
| 2 | QY | QS | S_PT1 | S_PT0 | S_IT1 | S_IT0 | S_CE1 | S_CE0 |
| 3 | Raw | HDR_DC | HDR_FP | HDR_HFR | Reserved (0) | | | |
| 4 | HDR1 | HDR2 | HDR3 | HDR4 | Reserved (0) | | | |
| 5 | VSIF | AVIF | DRIF | Reserved (0) | | | | |
| 6…7 | Maximum_Panel_Brightness (cd/m2) | | | | | | | |
| 7…8 | Maximum_Extended Range (%) | | | | | | | |
| 9…N | Reserved (0) | | | | | | | |

FIG. 17

EXEMPLARY HDR INFORMATION STRUCTURE OF Vendor Specific InfoFrame

| Byte# | 7 | 6 | 5 | 4 | 3 | 2 | 1 | 0 |
|---|---|---|---|---|---|---|---|---|
| 0 | Packet Type (0x81) ||||||||
| 1 | Version ||||||||
| 2 | 0 | 0 | 0 | Length (M-3) |||||
| 3 | Checksum ||||||||
| 4...6 | 24bit IEEE Registration Identifier (0x000C03) LSB first ||||||||
| 7 | 0 | HDR | HDR_Mode ||| Reserved (0) |||
| 8 | HDR_Meta_Type |||| Reserved(0) ||||
| 9 | Raw | Reserved (0) |||||||
| 10...M | HDR_Gamut_Metadata ||||||||

FIG. 18

HDR_Meta_Type=1 EXEMPLARY INFORMATION STRUCTURE

| Byte# | 7 | 6 | 5 | 4 | 3 | 2 | 1 | 0 |
|---|---|---|---|---|---|---|---|---|
| 0 | | | | | | | | |
| 1...2 | HDR_Gamat_Metadata_Length (M=9) | | | | | | | |
| 3...4 | Reference_Screen_Luminance_White | | | | | | | |
| 5 | Extended_Range_White_Level | | | | | | | |
| 6...7 | Nominal_Black_Level_Value | | | | | | | |
| 8...9 | Nominal_White_Level_Value | | | | | | | |
| | Extended_White_Level_Value | | | | | | | |

FIG. 19

HDR_Meta_Type = 2 EXEMPLARY INFORMATION STRUCTURE

| Byte# | 7 | 6 | 5 | 4 | 3 | 2 | 1 | 0 |
|---|---|---|---|---|---|---|---|---|
| 0 | \multicolumn{8}{l}{HDR_Gamat_Metadata_Length (M=13)} |
| 1..2 | \multicolumn{8}{l}{Input_Knee_Point (%)} |
| 3..4 | \multicolumn{8}{l}{Output_Knee_Point (%)} |
| 5..8 | \multicolumn{8}{l}{Dynamic_Range (%)} |
| 9..12 | \multicolumn{8}{l}{Dynamic_Range_Luminance (cd/m$^2$)} |

FIG. 20

HDR_Meta_Type=3 EXEMPLARY INFORMATION STRUCTURE

| Byte# | 7 | 6 | 5 | 4 | 3 | 2 | 1 | 0 |
|---|---|---|---|---|---|---|---|---|
| 0 | | | | | | | | |
| 1…2 | HDR_Gamat_Metadata_Length (M=4) | | | | | | | |
| 3 | Screen_Luminance_White_Level | | | | | | | |
| | Screen_Luminance_Black_Level | | | | | | | |
| 4 | Gamat_Value | | | | | | | |

FIG. 21

HDR_Meta_Type = 4 EXEMPLARY INFORMATION STRUCTURE

| Byte# | 7 | 6 | 5 | 4 | 3 | 2 | 1 | 0 |
|---|---|---|---|---|---|---|---|---|
| 0 | | | | | | | | |
| 1...4 | HDR_Gamat_Metadata_Length (M=17+3*i) | | | | | | | |
| 5...8 | input_d_range | | | | | | | |
| 9...12 | input_disp_luminance | | | | | | | |
| 13...16 | output_d_range | | | | | | | |
| 17 | output_disp_luminance | | | | | | | |
| 18...20 | knee_point\Number (i) | | | | | | | |
| 21...23 | input_knee_point [1], output_knee_point [1] | | | | | | | |
| | input_knee_point [2], output_knee_point [2] | | | | | | | |
| ¦ | ¦ | | | | | | | |
| 15+3*i...17+3*i | input_knee_point [i], output_knee_point [i] | | | | | | | |

FIG. 22

EXEMPLARY HDR INFORMATION STRUCTURE OF Auxiliary Video InfoFrame

| Byte# | 7 | 6 | 5 | 4 | 3 | 2 | 1 | 0 |
|---|---|---|---|---|---|---|---|---|
| 0 | Packet Type (0x82) ||||||||
| 1 | Version (0x01 or 0x02) ||||||||
| 2 | 0 | 0 | 0 | Length (0x0D) |||||
| 3 | CheckSum ||||||||
| 4...16 | CEA-861-D Data Byte 1 ... 13 ||||||||
| 17 | 0 | HDR | VSIF_Ext | Reserved (0) |||||
| 18 | Raw | HDR_Mode | Reserved(0) ||||||
| 19 | HDR_Meta_Type | Reserved (0) |||||||
| 20...27 | HDR_Gamat_Metadata ||||||||

FIG. 23

EXEMPLARY DATA STRUCTURE OF Dynamic Range InfoFrame

| Byte# | 7 | 6 | 5 | 4 | 3 | 2 | 1 | 0 |
|---|---|---|---|---|---|---|---|---|
| 0 | Packet Type (0x86) ||||||||
| 1 | Version (0x01) ||||||||
| 2 | Length (M-3) ||||||||
| 3 | Check Sum ||||||||
| 4 | 0 | HDR Raw | Reserved (0) ||||||
| 5 | HDR_Mode | Reserved(0) |||||||
| 6 | HDR_Meta_Type | Reserved (0) |||||||
| 7…M | HDR_Gamat_Metadata ||||||||

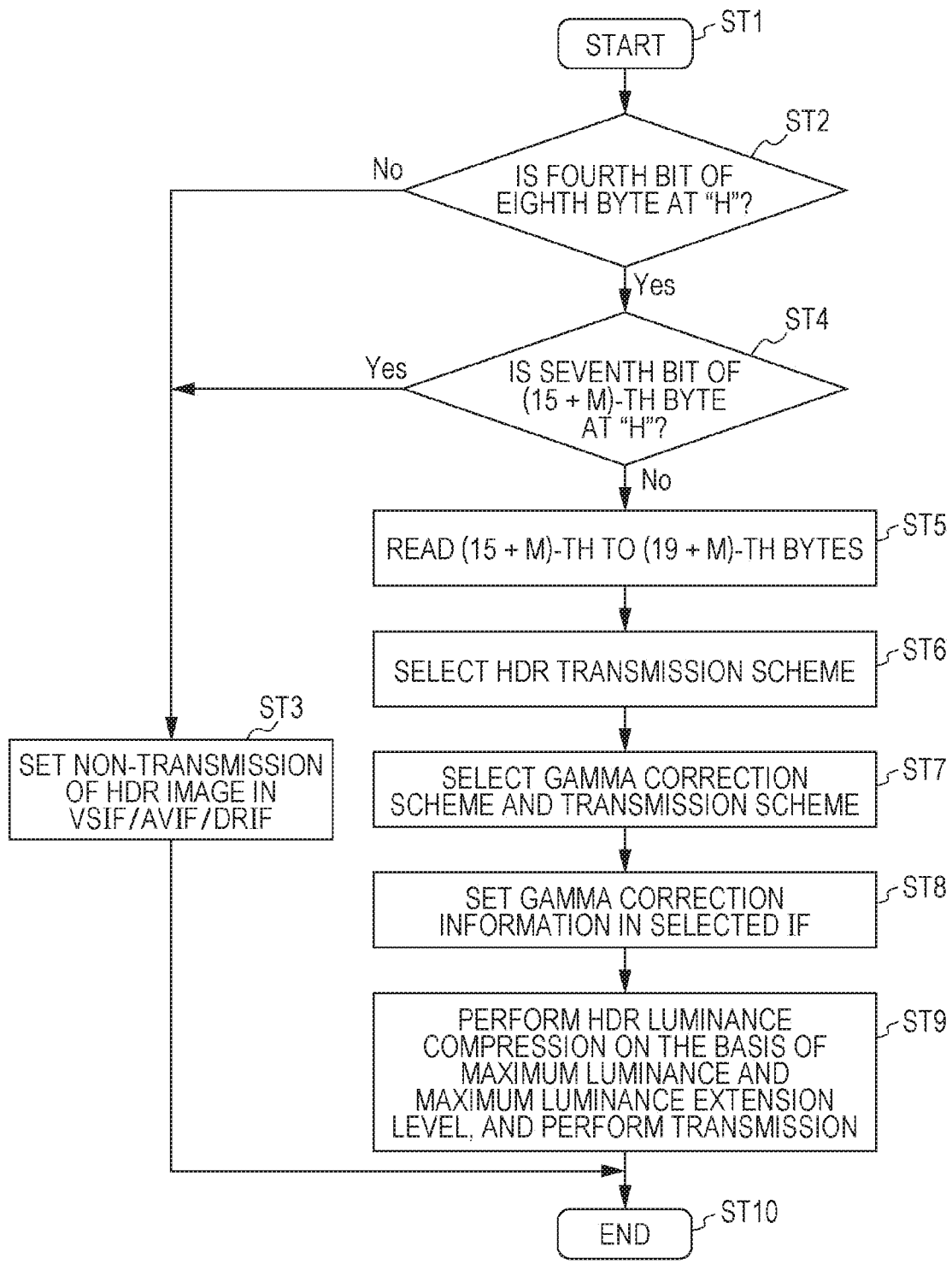

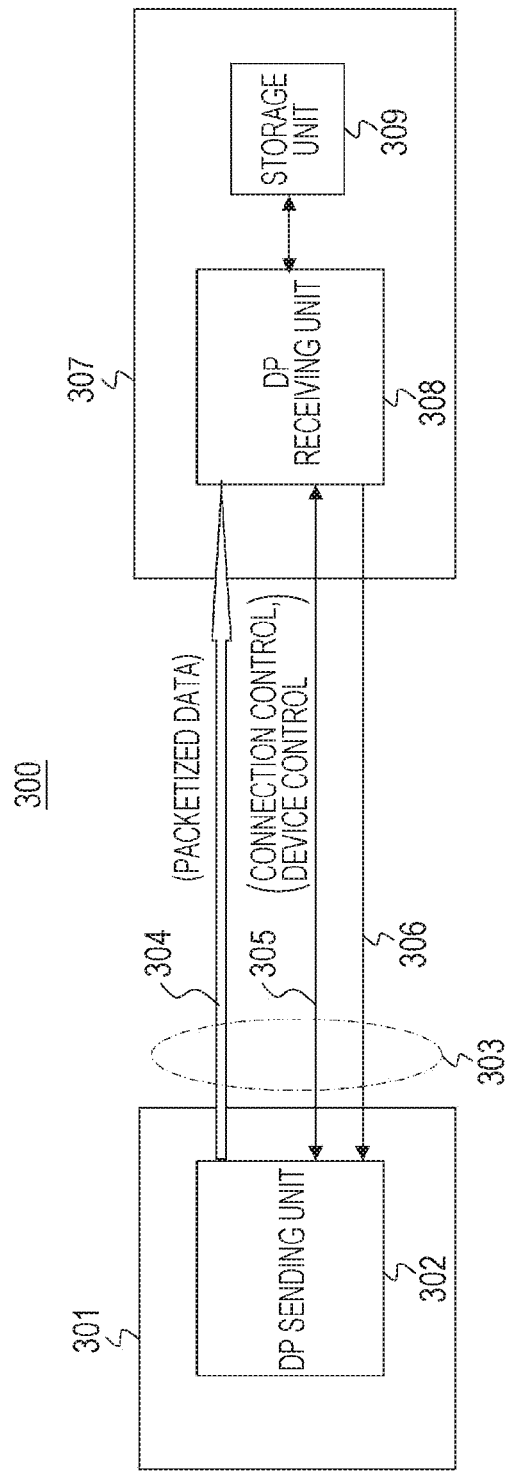

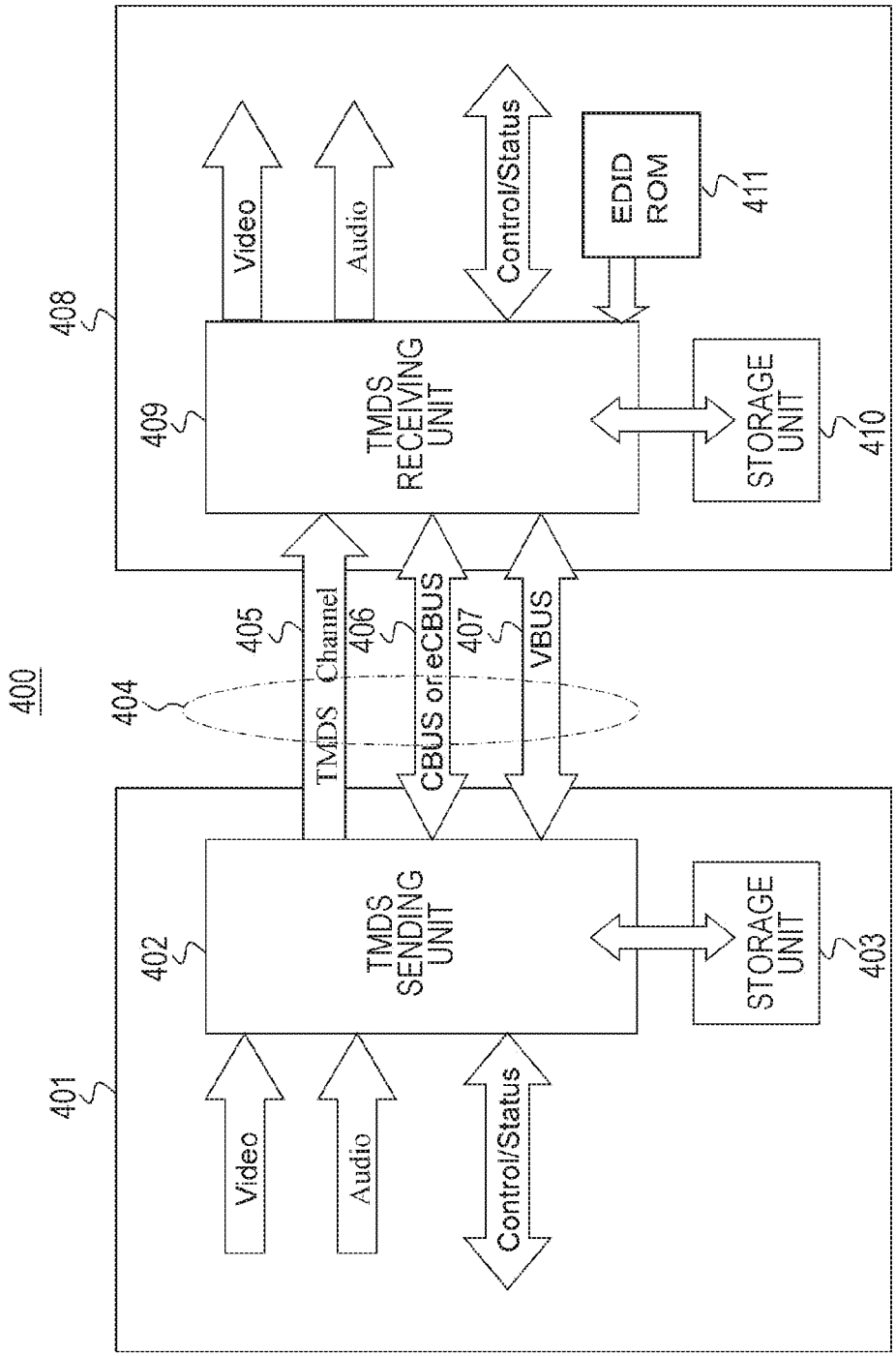

SENDING DEVICE, METHOD OF SENDING HIGH DYNAMIC RANGE IMAGE DATA, RECEIVING DEVICE, AND METHOD OF RECEIVING HIGH DYNAMIC RANGE IMAGE DATA

CROSS REFERENCE TO RELATED APPLICATIONS

This application is a U.S. National Phase of International Patent Application No. PCT/JP2015/081516 filed on Nov. 9, 2015, which claims priority benefit of Japanese Patent Application No. JP 2014-232414 filed in the Japan Patent Office on Nov. 17, 2014. Each of the above-referenced applications is hereby incorporated herein by reference in its entirety.

TECHNICAL FIELD

The present invention relates to a sending device, a method of sending high dynamic range image data, a receiving device, a method of receiving high dynamic range image data, and a program, and more particularly relates to a sending device or the like that sends high dynamic range image data for displaying a high dynamic range image.

BACKGROUND ART

In recent years, a high definition multimedia interface (HDMI) has been widely used as a communication interface that transmits at a high speed a digital video signal, that is, an uncompressed (baseband) video signal (image data), and a digital audio signal (audio data) accompanying the video signal, for example, from a digital versatile disc (DVD) recorder, a set-top box, or other audio visual (AV) sources to a television receiver, a projector, or other displays. For example, Non-Patent Document 1 describes a specific HDMI standard.

For example, an AV system or the like may have a disc player serving as a source device and a television receiver serving as a sink device coupled to each other by means of the HDMI. The luminance of image data recorded in the disc player is adjusted on the assumption that the image data are displayed on a display device for which a maximum luminance of 100 cd/m$^2$ is specified.

However, owing to advances in technology, a display device having a maximum luminance of about 1000 cd/m$^2$ exceeding the conventional maximum luminance of 100 cd/m$^2$ has been put into practical use, and the high-luminance output capability of the display device has not been sufficiently utilized.

In this regard, a high dynamic range (HDR) process has been proposed and put into practical use for still image capturing and a post process. In the HDR process, a luminance dynamic range process is performed, that is, a maximum luminance process for image data is performed so that the maximum luminance exceeds 100 cd/m$^2$. For example, Patent Document 1 has proposed a system of recording HDR image data and a process therefor.

CITATION LIST

Non-Patent Document

Non-Patent Document 1: High-Definition Multimedia Interface Specification Version 1.4b, Oct. 11, 2011

Patent Document

Patent Document 1: Japanese Patent Application Laid-Open No. 2005-352482

SUMMARY OF THE INVENTION

Problems to be Solved by the Invention

Conventionally, a high dynamic range transmission specification for a digital interface such as the HDMI has not been proposed at all.

An object of the present technology is to enable high dynamic range image data to be successfully transmitted between devices.

Solutions to Problems

A concept of the present technology is a sending device including:

a data sending unit configured to send high dynamic range image data to an external device; and an information sending unit configured to send, to the external device, transmission scheme information and/or gamma correction information for the high dynamic range image data that are sent by the data sending unit.

In the present technology, the high dynamic range image data are sent to the external device by the data sending unit. For example, the data sending unit may send the high dynamic range image data to the external device using a differential signal.

For example, the high dynamic range image data may include first data and second data, and the data sending unit may construct the first data and the second data using a video format defined for a three-dimensional image, and send the first data and the second data to the external device. In addition, for example, the high dynamic range image data may include first data and second data, and the data sending unit may send the first data to the external device as a first frame image, and send the second data to the external device as a second frame image.

For example, the high dynamic range image data may include first data and second data, and the first data may be lower 8-bit data of the high dynamic range image data, and the second data may be upper bit data of the high dynamic range image data, or the first data may be upper 8-bit data of the high dynamic range image data, and the second data may be lower bit data of the high dynamic range image data.

The transmission scheme information and/or the gamma correction information for the high dynamic range image data that are sent by the data sending unit are sent to the external device by the information sending unit. For example, the information sending unit may send, to the external device, the transmission scheme information and/or the gamma correction information for the high dynamic range image data that are sent by the data sending unit by inserting the transmission scheme information and/or the gamma correction information in a blanking interval of the high dynamic range image data.

In addition, for example, the transmission scheme information and the gamma correction information for the high dynamic range image data that are sent by the data sending unit may include at least one of information about a maximum white level of the high dynamic range image data exceeding 100%, a bit value for expression of a black level, a bit value for expression of a 100% white level, a flag indicating whether a high dynamic range process is performed, a receiving device luminance level expected for the 100% white level, a luminance input level required for luminance expansion for a high dynamic range image, and an expansion luminance output level required for the luminance expansion for the high dynamic range image.

As described above, in the present technology, the high dynamic range image data are sent to the external device, and the transmission scheme information and/or the gamma correction information for the high dynamic range image data are sent to the external device. Therefore, the external device can easily understand, for example, what kind of transmission scheme and what kind of gamma correction scheme are used for the sent high dynamic range image data. Therefore, the high dynamic range image data can be successfully transmitted.

Note that the present technology may further include, for example: an information receiving unit configured to receive transmission scheme information and/or gamma correction scheme information for the high dynamic range image data which the external device is capable of dealing with, the transmission scheme information and/or the gamma correction scheme information being sent from the external device; and a scheme selecting unit configured to select a predetermined transmission scheme and/or gamma correction scheme from among transmission schemes and/or gamma correction schemes for the high dynamic range image data which the external device is capable of dealing with on the basis of the transmission scheme information and/or the gamma correction scheme information received at the information receiving unit, and the data sending unit may send, to the external device, the high dynamic range image data conforming to the transmission scheme and/or the gamma correction scheme selected by the scheme selecting unit.

In this case, the external device can always deal with the transmission scheme and/or the gamma correction scheme for the high dynamic range image data that are sent to the external device. Therefore, the high dynamic range image data can be successfully transmitted.

For example, the information receiving unit may further receive transmission scheme information for the transmission scheme information and/or the gamma correction information for the high dynamic range image data, the transmission scheme information being sent from the external device, and the information sending unit may send, to the external device, the transmission scheme information and/or the gamma correction information for the high dynamic range image data using a transmission scheme indicated by the received transmission scheme information. In this case, the transmission scheme information and/or the gamma correction information for the high dynamic range image data can be successfully sent using the transmission scheme which the external device is capable of dealing with.

In addition, another concept of the present technology is a receiving device including:

a data receiving unit configured to receive, from an external device, high dynamic range image data for displaying a high dynamic range image;

an information receiving unit configured to receive, from the external device, transmission scheme information and/or gamma correction information for the high dynamic range image data that are received at the data receiving unit; and a data processing unit configured to process the high dynamic range image data received at the data receiving unit on the basis of the transmission scheme information and/or the gamma correction information received at the information receiving unit.

In the present technology, the high dynamic range image data for displaying the high dynamic range image are received by the data receiving unit from the external device. For example, the data receiving unit may receive the high dynamic range image data from the external device using a differential signal.

The transmission scheme information and/or the gamma correction information for the high dynamic range image data that are received at the data receiving unit are received by the information receiving unit from the external device. Then, the high dynamic range image data received at the data receiving unit are processed by the data processing unit on the basis of the transmission scheme information and/or the gamma correction information received at the information receiving unit.

For example, the information receiving unit may extract the transmission scheme information and/or the gamma correction information for the high dynamic range image data from a blanking interval of the high dynamic range image data received at the data receiving unit.

As described above, in the present technology, the high dynamic range image data that are sent from the sending side are processed on the basis of the transmission scheme information and/or the gamma correction information that are similarly sent from the sending side, and an appropriate process can be easily performed on the received high dynamic range image data.

Note that the present technology may further include, for example: an information storage unit configured to store transmission scheme information and/or gamma correction scheme information for the high dynamic range image data which the receiving device is capable of dealing with; and an information sending unit configured to send, to the external device, the transmission scheme information and/or the gamma correction scheme information stored in the information storage unit. In this manner, the transmission scheme information and/or the gamma correction scheme information for the high dynamic range image data which the receiving device is capable of dealing with are sent to the sending side, which enables the sending side to send the high dynamic range image data conforming to the transmission scheme and/or the gamma correction scheme which the receiving device is capable of dealing with.

For example, the information storage unit may further store at least one of information about a maximum luminance capable of being displayed, information about a maximum expansion luminance level capable of undergoing a high dynamic range process, and an expansion process prohibition flag.

In addition, for example, the information storage unit may further store transmission scheme information for the transmission scheme information and/or the gamma correction information for the high dynamic range image data, and the information sending unit may further send, to the external device, the transmission scheme information for the transmission scheme information and/or the gamma correction information for the high dynamic range image data stored in the information storage unit. Consequently, the transmission scheme information and/or the gamma correction information for the high dynamic range image data can be reliably sent using the transmission scheme which the receiving device is capable of dealing with.

Effects of the Invention

According to the present technology, high dynamic range image data can be successfully transmitted between devices.

Note that the effects described in the present description are only examples, and the effects of the present invention are not limited to these effects. Additional effects may also be obtained.

BRIEF DESCRIPTION OF DRAWINGS

FIG. 1 is a block diagram illustrating an exemplary configuration of an AV system as an embodiment.

FIG. 2 is a block diagram illustrating an exemplary configuration of an HDMI sending unit of a disc player and an HDMI receiving unit of a television receiver.

FIG. 3 is a diagram illustrating various periods of transmission data used when image data of 1920 pixels wide× 1080 lines long are transmitted through TMDS channels #0, #1, and #2.

FIGS. 4(a) and 4(b) are diagrams for explaining a conventional 8-bit transmission scheme.

FIG. 12 is a diagram for explaining HDR gamma correction scheme (3).

FIG. 15 is a diagram illustrating an exemplary data structure of a vender specific region of the E-EDID.

FIG. 16 is a diagram illustrating an exemplary data structure of a video capability region of the E-EDID.

FIG. 17 is a diagram illustrating an exemplary data structure of an HDMI vendor specific InfoFrame packet.

FIG. 18 is a diagram illustrating an exemplary data structure of gamma correction information transmitted when HDR_Meta_Type=1 is satisfied.

FIG. 19 is a diagram illustrating an exemplary data structure of the gamma correction information transmitted when HDR_Meta_Type=2 is satisfied.

FIG. 20 is a diagram illustrating an exemplary data structure of the gamma correction information transmitted when HDR_Meta_Type=3 is satisfied.

FIG. 21 is a diagram illustrating an exemplary data structure of the gamma correction information transmitted when HDR_Meta_Type=4 is satisfied.

FIG. 22 is a diagram illustrating an exemplary data structure of an HDMI auxiliary video InfoFrame packet.

FIG. 23 is a diagram illustrating an exemplary data structure of an HDMI dynamic range InfoFrame packet.

FIG. 25 is a flowchart illustrating an exemplary process of selecting an HDR transmission scheme performed in the source device (disc player).

FIG. 27 is a block diagram illustrating an exemplary configuration of a DP system with the use of a DP interface.

FIG. 28 is a block diagram illustrating an exemplary configuration of an MHL system with the use of an MHL interface.

MODE FOR CARRYING OUT THE INVENTION

Figure 5:
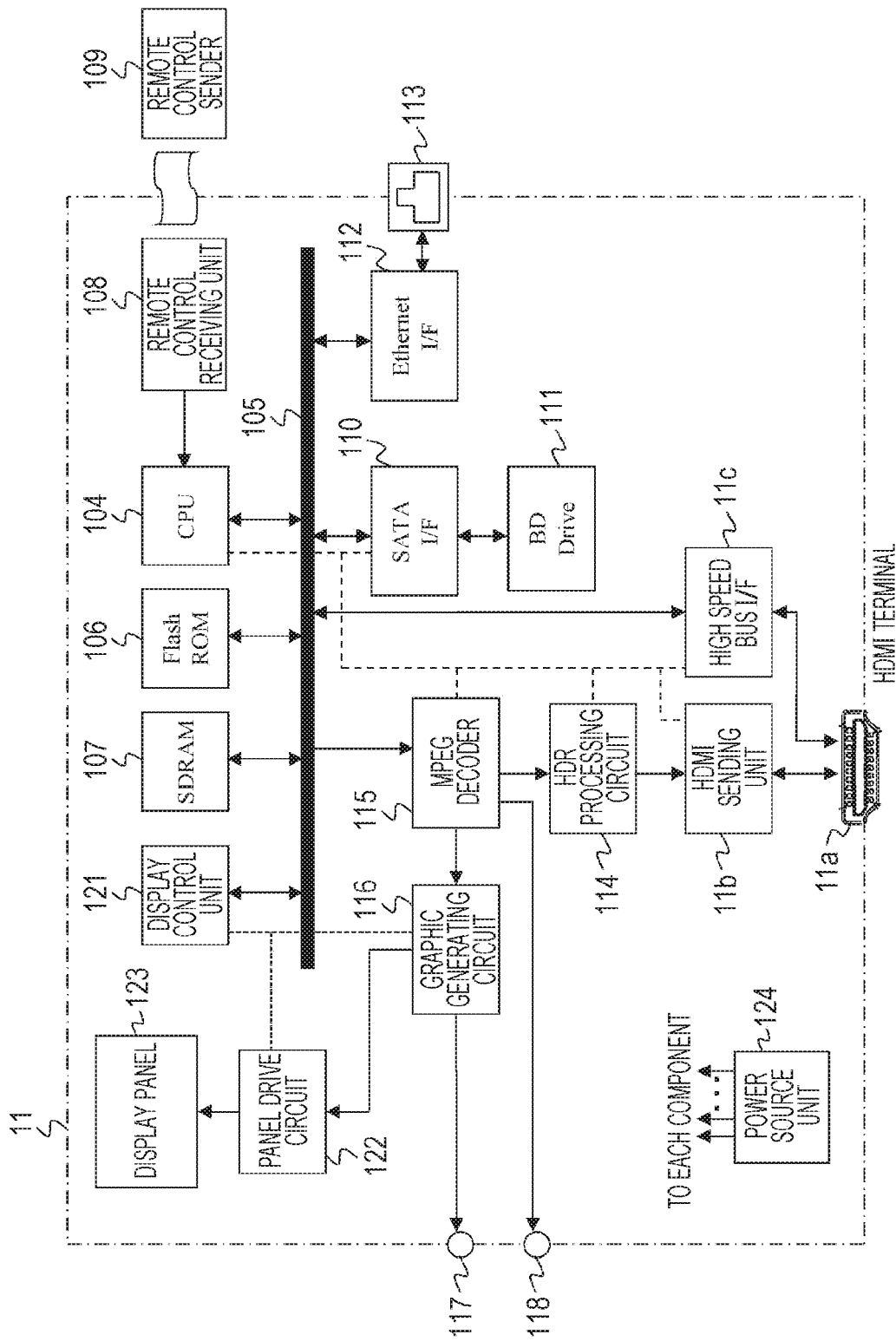
FIG. 5 is a block diagram illustrating an exemplary configuration of the disc player (source device) constituting the AV system.

Hereinafter, a mode for carrying out the invention (hereinafter referred to as an "embodiment") will be described. Note that the description will be provided in the following order:
1. EMBODIMENT
2. VARIATION 1. Embodiment

[Exemplary Configuration of AV System]

FIG. 1 is a diagram illustrating an exemplary configuration of an audio visual (AV) system 10 as an embodiment. The AV system 10 has a disc player 11 serving as a source device and a television receiver 12 serving as a sink device. The disc player 11 and the television receiver 12 are coupled to each other via an HDMI cable 13 serving as a transmission line.

The disc player 11 is provided with an HDMI terminal 11a to which an HDMI sending unit (HDMITX) 11b and a high speed bus interface (high speed bus I/F) 11c are connected. The television receiver 12 is provided with an HDMI terminal 12a to which an HDMI receiving unit (HDMI RX) 12b and a high speed bus interface (high speed bus I/F) 12c are connected. One end of the HDMI cable 13 is connected to the HDMI terminal 11a of the disc player 11, and the other end of the HDMI cable 13 is connected to the HDMI terminal 12a of the television receiver 12.

In the AV system 10 illustrated in FIG. 1, uncompressed image data reproduced and obtained in the disc player 11 are sent to the television receiver 12 via the HDMI cable 13, and an image of the image data sent from the disc player 11 is displayed on the television receiver 12. In addition, uncompressed audio data reproduced and obtained in the disc player 11 are sent to the television receiver 12 via the HDMI cable 13, and audio of the audio data sent from the disc player 11 is output by the television receiver 12.

FIG. 2 is a diagram illustrating an exemplary configuration of the HDMI sending unit 11b of the disc player 11 and the HDMI receiving unit 12b of the television receiver 12 in the AV system 10 of FIG. 1. In a valid image period 14 (hereinafter appropriately referred to as an active video period) (refer to FIG. 3) obtained by removing a horizontal blanking period 15 and a vertical blanking period 16 from a period from one vertical synchronizing signal to the next vertical synchronizing signal, the HDMI sending unit 11b sends a differential signal corresponding to pixel data of an uncompressed image for one screen to the HDMI receiving unit 12b in one direction through a plurality of channels. In addition, in the horizontal blanking period 15 or the vertical blanking period 16, the HDMI sending unit 11*b* sends a differential signal corresponding to at least audio data accompanying the image, control data, and other auxiliary data or the like to the HDMI receiving unit 12*b* in the one direction through the plurality of channels.

In other words, the HDMI sending unit 11*b* has an HDMI transmitter 21. For example, the transmitter 21 converts the pixel data of the uncompressed image into the corresponding differential signal, and serially transmits the differential signal to the HDMI receiving unit 12*b* in the one direction through the plurality of channels, that is, three transition minimized differential signaling (TMDS) channels #0, #1, and #2.

In addition, the transmitter 21 also converts the audio data accompanying the uncompressed image, required control data, and other auxiliary data or the like into the corresponding differential signal, and serially transmits the differential signal to the HDMI receiving unit 12*b* in the one direction through the three TMDS channels #0, #1, and #2. Furthermore, the transmitter 21 sends, to the HDMI receiving unit 12*b* through a TMDS clock channel, a pixel clock synchronized with the pixel data that are sent through the three TMDS channels 0, #1, and #2. In this case, 10-bit pixel data are sent through a single TMDS channel # i (i=0, 1, 2) during a single clock cycle of the pixel clock.

In the active video period 14 (refer to FIG. 3), the HDMI receiving unit 12*b* receives the differential signal corresponding to the pixel data sent from the HDMI sending unit 11*b* in the one direction through the plurality of channels. In addition, in the horizontal blanking period 15 (refer to FIG. 3) or the vertical blanking period 16 (refer to FIG. 3), the HDMI receiving unit 12*b* receives the differential signal corresponding to the audio data and the control data sent from the HDMI sending unit 11*b* in the one direction through the plurality of channels.

In other words, the HDMI receiving unit 12*b* has an HDMI receiver 22. The receiver 22 receives the differential signal corresponding to the pixel data and the differential signal corresponding to the audio data and the control data sent from the HDMI sending unit 11*b* coupled via the HDMI cable 13 in the one direction through the TMDS channels #0, #1, and #2. At this time, the reception is performed in synchronization with the pixel clock sent from the same HDMI sending unit 11*b* through the TMDS clock channel.

A transmission channel of an HDMI system having the HDMI source sending unit 11*b* and the HDMI receiving unit 12*b* includes the three TMDS channels #0 to #2 serving as transmission channels for transmitting the pixel data and the audio data, and the TMDS clock channel serving as a transmission channel for transmitting the pixel clock. In addition, the transmission channel further includes transmission channels called a display data channel (DDC) 23 and a consumer electronics control (CEC) line 24.

The DDC 23 includes two signal lines contained in the HDMI cable 13, and is used when the HDMI sending unit 11*b* reads enhanced extended display identification data (E-EDID) from the HDMI receiving unit 12*b* coupled via the HDMI cable 13. Specifically, the HDMI receiving unit 12*b* has, in addition to the HDMI receiver 22, an EDID read only memory (ROM) that stores the E-EDID, i.e., performance information about performance (configuration and capability) of the HDMI receiving unit 12*b* itself.

The HDMI sending unit 11*b* reads the E-EDID of the HDMI receiving unit 12*b* from the HDMI receiving unit 12*b* coupled via the HDMI cable 13 through the DDC 23. Then, the HDMI sending unit 11*b* recognizes, on the basis of the E-EDID, setting of the performance of the HDMI receiving unit 12*b*, that is, for example, an image format (profile) which an electronic device having the HDMI receiving unit 12*b* supports, such as, for example, RGB, YCbCr 4:4:4, and YCbCr 4:2:2.

The CEC line 24 includes one signal line contained in the HDMI cable 13, and is used when bidirectional communication of controlling data is performed between the HDMI sending unit 11*b* and the HDMI receiving unit 12*b*. In addition, the HDMI cable 13 also includes a line (HPD line) 25 connected to a pin called hot plug detect (HPD).

Using the line 25, the source device can detect connection of the sink device by means of a DC bias potential. In this case, in terms of the source device, the HPD line has a function to receive a notification of a connection state from the sink device by means of the DC bias potential. Meanwhile, in terms of the sink device, the HPD line has a function to notify the source device of the connection state by means of the DC bias potential.

In addition, the HDMI cable 13 also includes a line (power source line) 26 that is used for supplying power from the source device to the sink device. Furthermore, the HDMI cable 13 includes a reserve line 27. The HPD line 25 and the reserve line 27 are sometimes used to constitute a pair of differential transmission lines, which is used as a bidirectional communication channel.

FIG. 3 is a diagram illustrating various periods of transmission data used when image data of 1920 pixels wide× 1080 lines long are transmitted through the TMDS channels #0, #1, and #2. In a video field for transmitting the transmission data through the three HDMI TMDS channels #0, #1, and #2, three kinds of periods, that is, a video data period 17, a data island period 18, and a control period 19, exist in accordance with a kind of the transmission data.

A video field period as used herein is a period from a rising edge (active edge) of a certain vertical synchronizing signal to a rising edge of the next vertical synchronizing signal. The video field period can be separated into the horizontal blanking interval 15 (horizontal blanking), the vertical blanking interval 16 (vertical blanking), and the valid pixel period 14 (active video) that is a period obtained by removing the horizontal blanking interval and the vertical blanking interval from the video field period.

The video data period 17 is assigned to the valid pixel period 14. In the video data period 17, data of valid pixels (active pixels) of 1920 pixels×1080 lines constituting the uncompressed image data for one screen are transmitted. The data island period 18 and the control period 19 are assigned to the horizontal blanking interval 15 and the vertical blanking interval 16. In the data island period 18 and the control period 19, auxiliary data are transmitted.

In other words, the data island period 18 is assigned to a part of the horizontal blanking interval 15 and the vertical blanking interval 16. In the data island period 18, auxiliary data which are not related to control, e.g., a packet of audio data or the like, are transmitted. The control period 19 is assigned to the other part of the horizontal blanking interval 15 and the vertical blanking interval 16. In the control period 19, auxiliary data which are related to control, e.g., a vertical synchronizing signal, a horizontal synchronizing signal, and a control packet or the like, are transmitted.

In the present embodiment, the disc player 11 receives, from the television receiver 12 via the HDMI cable 13, transmission scheme information and gamma correction scheme information for high dynamic range image data which the television receiver 12 can deal with. Hereinafter, the high dynamic range is appropriately abbreviated to "HDR". In this case, the television receiver 12 stores, in a storage unit, the transmission scheme information and the gamma correction scheme information for the HDR image data which the television receiver 12 itself deals with, and sends the transmission scheme information and the gamma correction scheme information to the disc player 11 via the HDMI cable 13. Note that conventionally, there has been no specification for transmitting an HDR image, and there has been no compatibility between manufacturers.

On the basis of the transmission scheme information and the gamma correction scheme information received from the television receiver 12, the disc player 11 selects a predetermined transmission scheme and gamma correction scheme from among transmission schemes for the HDR image data which the television receiver can deal with. In this case, for example, when a plurality of transmission schemes and gamma correction schemes for the HDR image data which the television receiver 12 can deal with exists, the disc player 11 selects a transmission scheme that causes the least image deterioration and a gamma correction scheme that facilitates the approximation the most.

The disc player 11 sends the HDR image data conforming to the selected transmission scheme and gamma correction scheme to the television receiver 12 via the HDMI cable 13. At this time, the disc player 11 sends, to the television receiver 12 via the HDMI cable 13, transmission scheme information and gamma correction information for the HDR image data to be sent.

The television receiver 12 receives the HDR image data from the disc player 11 via the HDMI cable 13, and receives the transmission scheme information and the gamma correction information therefor. The television receiver 12 processes the received HDR image data on the basis of the received transmission scheme information and gamma correction information to generate HDR image data for display. The maximum luminance of an object in the natural world reaches even 2000 cd/m$^2$ or more.

Conventionally, for example, the luminance of image data recorded in a disc player is adjusted on the assumption that the image data are displayed on a display device for which a maximum luminance of 100 cd/m$^2$ is specified. In other words, conventionally, the luminance of the image data is significantly compressed as compared with a luminance value in the natural world. In addition, a display device having a maximum luminance of about 1000 cd/m$^2$ exceeding the conventional maximum luminance of 100 cd/m$^2$ has been put into practical use. A problem in the image quality is caused when the image data are processed in the display device and a luminance value of the image data originally adjusted to 100 cd/m$^2$ is increased so as to conform to 1000 cd/m$^2$.

The HDR image has been proposed to express an image having a high luminance, that is, a while level luminance of 100% or more. The normal 100% while level luminance is expressed by a bit value of 235 or 255 in the 8-bit system. In order to express the luminance exceeding the 100% white level luminance, bit number needs to be equal to or more than 8 bits for gradations. To sum up, the HDR image data are, for example, 10-bit, 12-bit, or 16-bit image data.

FIGS. 4(a) and 4(b) are conceptual diagrams illustrating the conventional 8-bit transmission scheme. FIG. 4(a) is a diagram illustrating examples of luminance levels of original 10-bit HDR image data and bit values therefor. FIG. 4(b) is a diagram illustrating examples of luminance levels of 8-bit image data and bit values therefor. The 10-bit HDR image data have been converted into the 8-bit image data in order to be transmitted using the 8-bit transmission scheme. In this case, since the 100% luminance level is assigned to the 8-bit value "235", the 200% luminance is assigned to the maximum 8-bit value "255". As a result, the luminance is compressed, and the information exceeding the 108% luminance is lost.

[Exemplary Configuration of Disc Player]

FIG. 5 is a diagram illustrating an exemplary configuration of the disc player 11. The disc player 11 has the HDMI terminal 11a, the HDMI sending unit 11b, and the high speed bus interface 11c. In addition, the disc player 11 also has a central processing unit (CPU) 104, an internal bus 105, a flash read only memory (ROM) 106, a synchronous random access memory (SDRAM) 107, a remote control receiving unit 108, and a remote control sender 109.

In addition, the disc player 11 also has a serial advanced technology attachment (SATA) interface 110, a Blu-Ray Disc (BD) drive 111, an Ethernet interface (Ethernet I/F) 112, and a network terminal 113. In addition, the disc player 11 also has a moving picture expert group (MPEG) decoder 115, a graphic generating circuit 116, a video output terminal 117, an audio output terminal 118, and an HDR processing circuit 114.

In addition, the disc player 11 may have a display control unit 121, a panel drive circuit 122, a display panel 123, and a power source unit 124. Note that the "Ethernet" is a registered trademark. The high speed bus interface 11c, the CPU 104, the flash ROM 106, the SDRAM 107, the remote control receiving unit 108, the SATA interface 110, the Ethernet interface 112, and the MPEG decoder 115 are connected to the internal bus 105.

The CPU 104 controls operation of each component of the disc player 11. The flash ROM 106 accommodates control software and stores data. The SDRAM 107 constitutes a work area of the CPU 104. The CPU 104 expands software and data read from the flash ROM 106 on the SDRAM 107 to start the software, and controls each component of the disc player 11.

The remote control receiving unit 108 receives a remote control signal (remote control code) sent from the remote control sender 109, and supplies the remote control code to the CPU 104. The CPU 104 controls each component of the disc player 11 in accordance with the remote control code. Note that in the present embodiment, a remote control unit is described as a user instruction input unit. However, the user instruction input unit may be another configuration such as, for example, a switch, a wheel, a touch panel unit through which instruction input is performed by proximity/touch, a mouse, a keyboard, a gesture input unit that detects instruction input by means of a camera, and an audio input unit through which instruction input is performed by audio.

The BD drive 111 records content data in a BD disc (not illustrated) serving as a disc-like recording medium, or reproduces the content data from the BD disc. The BD drive 111 is coupled to the internal bus 105 via the SATA interface 110. The MPEG decoder 115 performs a decode process on an MPEG2 stream reproduced by the BD drive 111, and obtains image and audio data.

The graphic generating circuit 116 performs, as necessary, a superposing process for graphics data on the image data obtained by the MPEG decoder 115. The video output terminal 117 outputs the image data output from the graphic generating circuit 116. The audio output terminal 118 outputs the audio data obtained by the MPEG decoder 115.

The panel drive circuit 122 drives the display panel 123 on the basis of the video (image) data output from the graphic generating circuit 260. The display control unit 121 controls the graphics generating circuit 116 and the panel drive circuit 122 to control the display on the display panel 123. The display panel 123 includes, for example, a liquid crystal display (LCD), a plasma display panel (PDP), and an organic electro-luminescence (organic EL) panel or the like.

Note that although the example illustrated in the present embodiment includes the display control unit 121 as well as the CPU 104, the CPU 104 may directly control the display on the display panel 123. In addition, the CPU 104 and the display control unit 121 may be contained in a single chip or configured as a plurality of cores. The power source unit 124 supplies power to each component of the disc player 11. The power source unit 124 may be an AC power source or a battery (storage battery or dry battery).

The HDMI sending unit (HDMI source) 11b exports baseband image (video) and audio data from the HDMI terminal 11a by means of communication that conforms to the HDMI. The high speed bus interface 11c is an interface for the bidirectional communication channel including a predetermined line (in the present embodiment, the reserve line and the HPD line) constituting the HDMI cable 13.

The high speed bus interface 11c is inserted between the Ethernet interface 112 and the HDMI terminal 101. The high speed bus interface 11c sends sending data supplied from the CPU 104 from the HDMI terminal 101 to an opposite side device via the HDMI cable 13. In addition, the high speed bus interface 11c supplies, to the CPU 104, reception data received from the opposite side device from the HDMI cable 13 via the HDMI terminal 11a.

The HDR processing circuit 114 processes, among pieces of image data obtained by the MPEG decoder 115, HDR image data for displaying an HDR image so that the HDR image data conform to the transmission scheme when the HDR image data are sent through the HDMI TMDS channels. At this time, the HDR image data are constructed in accordance with, for example, a deep color image format, a three-dimensional image data format, or a high frame rate image format. The HDR processing circuit 114 and the HDMI sending unit 11b may be contained in a single chip or configured as a plurality of cores. The kinds of transmission schemes for the HDR image data, the selection of the transmission scheme, and packing formats for the respective schemes or the like will be described later in detail.

The operation of the disc player 11 illustrated in FIG. 5 will be briefly described. At the time of recording, the content data to be recorded are acquired via a digital tuner (not illustrated), via the Ethernet interface 112 from the network terminal 113, or via the high speed bus interface 11c from the HDMI terminal 11a. The content data are input to the SATA interface 110 and recorded in the BD disc by the BD drive 111. In some cases, the content data may be recorded in a hard disk drive (HDD, not illustrated) connected to the SATA interface 110.

At the time of reproduction, the content data (MPEG stream) reproduced from the BD disc by the BD drive 111 are supplied to the MPEG decoder 115 via the SATA interface 110. In the MPEG decoder 115, the decode process is performed on the reproduced content data, whereby the baseband image and audio data are obtained. The image data are output to the video output terminal 117 through the graphic generating circuit 116. In addition, the audio data are output to the audio output terminal 118.

In addition, at the time of the reproduction, the image data obtained by the MPEG decoder 115 are supplied to the panel drive circuit 122 through the graphic generating circuit 116 in accordance with user operation, and a reproduced image is displayed on the display panel 123. In addition, the audio data obtained by the MPEG decoder 115 are supplied to a speaker (not illustrated) in accordance with user operation, and audio corresponding to the reproduced image is output.

In addition, at the time of the reproduction, when the image and audio data obtained by the MPEG decoder 115 are sent through the HDMI TMDS channels, the image and audio data are supplied to the HDMI sending unit 11b, packed, and output from the HDMI sending unit 11b to the HDMI terminal 11a.

Note that in a case where the image data are HDR image data, the HDR image data are processed by the HDR processing circuit 114 so as to conform to the selected transmission scheme, and thereafter supplied to the HDMI sending unit 11b. In addition, at the time of the reproduction, when the content data reproduced by the BD drive 111 are exported to a network, the content data are output to the network terminal 113 via the Ethernet interface 112. Similarly, at the time of the reproduction, when the content data reproduced by the BD drive 111 are exported to the bidirectional communication channel of the HDMI cable 13, the content data are output to the HDMI terminal 11a via the high speed bus interface 11c. Here, before the image data are output, the image data may be encrypted using a copyright protection technology, e.g., HDCP, DTCP, and DTCP+ or the like, to be transmitted.

[Exemplary Configuration of Television Receiver]

Figure 6:
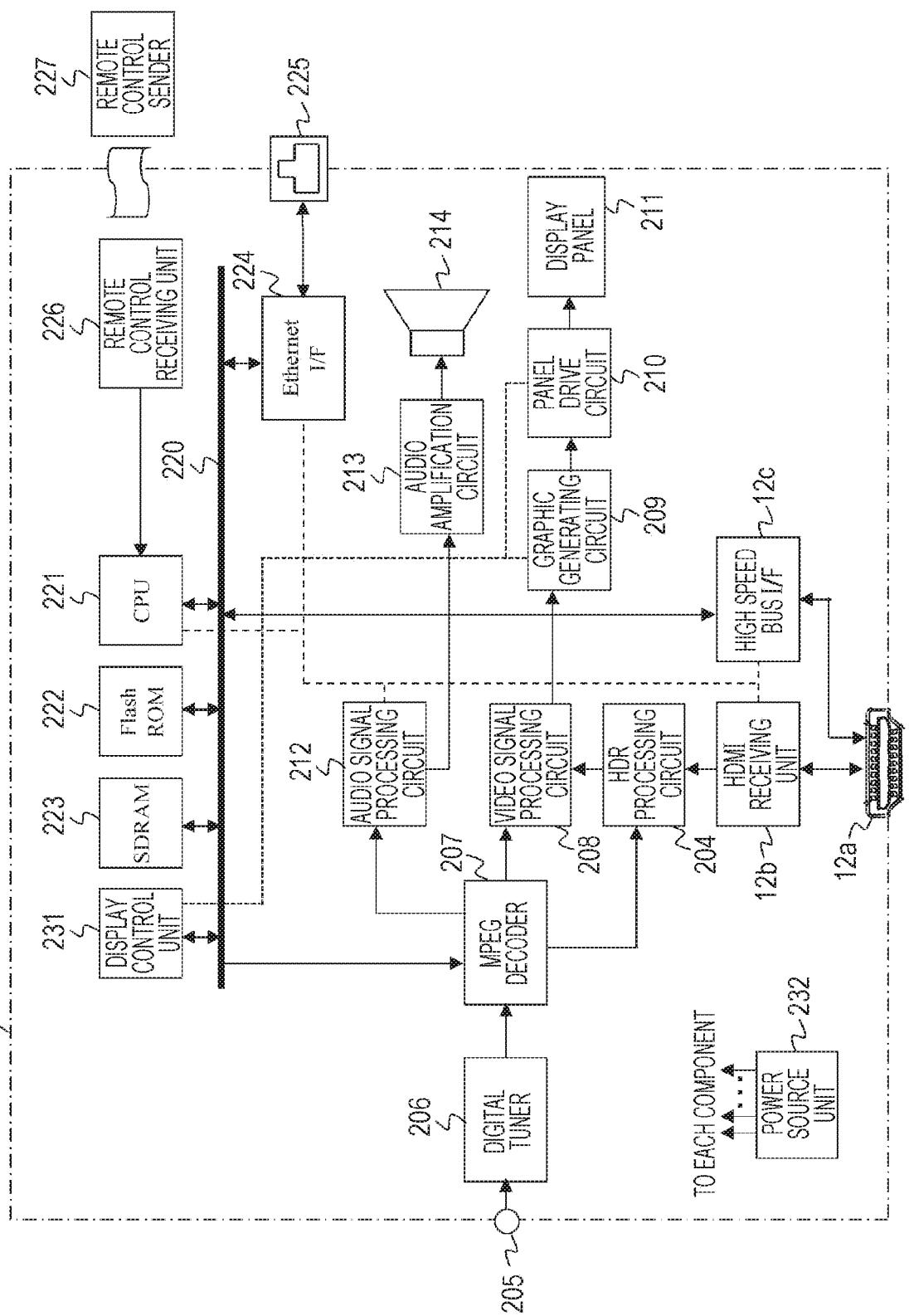
FIG. 6 is a block diagram illustrating an exemplary configuration of the television receiver (sink device) constituting the AV system.

FIG. 6 is a diagram illustrating an exemplary configuration of the television receiver 12. The television receiver 12 has the HDMI terminal 12a, the HDMI receiving unit 12b, the high speed bus interface 12c, and an HDR processing circuit 204. In addition, the television receiver 12 also has an antenna terminal 205, a digital tuner 206, an MPEG decoder 207, a video signal processing circuit 208, a graphic generating circuit 209, a panel drive circuit 210, and a display panel 211.

In addition, the television receiver 12 also has an audio signal processing circuit 212, an audio amplification circuit 213, a speaker 214, an internal bus 220, a CPU 221, a flash ROM 222, and a synchronous random access memory (SDRAM) 223. In addition, the television receiver 12 also has an Ethernet interface (Ethernet I/F) 224, a network terminal 225, a remote control receiving unit 226, and a remote control sender 227. In addition, the television receiver 12 also has a display control unit 231 and a power source unit 232. Note that the "Ethernet" is a registered trademark.

The antenna terminal 205 is a terminal through which a television broadcasting signal received by a reception antenna (not illustrated) is input. The digital tuner 206 processes the television broadcasting signal input to the antenna terminal 205, and extracts a partial transport stream (TS) (TS packet of video data and TS packet of audio data) from a predetermined transport stream corresponding to a channel selected by a user.

In addition, the digital tuner 206 also retrieves program specific information/service information (PSI/SI) from the obtained transport stream, and outputs the PSI/SI to the CPU 221. The process of extracting a partial TS of an arbitrary channel from a plurality of transport streams obtained by the digital tuner 206 is enabled by obtaining information of a packet ID (PID) of the arbitrary channel from the PSI/SI (PAT/PMT).

The MPEG decoder 207 performs a decode process on a video packetized elementary stream (PES) packet including the TS packet of the video data obtained by the digital tuner 206, and obtains image data. In addition, the MPEG decoder 207 also performs a decode process on an audio PES packet including the TS packet of the audio data obtained by the digital tuner 206, and obtains audio data.

The video signal processing circuit 208 and the graphic generating circuit 209 perform, as necessary, a scaling process (resolution conversion process), a superposing process for graphics data, and a gamma correction for the HDR image data or the like on the image data obtained by the MPEG decoder 207 or on image data received by the HDMI receiving unit 12b.

The panel drive circuit 210 drives the display panel 211 on the basis of the video (image) data output from the graphic generating circuit 209. The display control unit 231 controls the graphics generating circuit 209 and the panel drive circuit 210 to control the display on the display panel 211. The display panel 211 includes, for example, a liquid crystal display (LCD), a plasma display panel (PDP), and an organic electro-luminescence (organic EL) panel or the like.

Note that although the example illustrated in the present embodiment includes the display control unit 231 as well as the CPU 221, the CPU 221 may directly control the display on the display panel 211. In addition, the CPU 221 and the display control unit 231 may be contained in a single chip or configured as a plurality of cores. The power source unit 232 supplies power to each component of the television receiver 12. The power source unit 232 may be an AC power source or a battery (storage battery or dry battery).

The audio signal processing circuit 212 performs a necessary process such as a D/A conversion on the audio data obtained by the MPEG decoder 207. The audio amplification circuit 213 amplifies an audio signal output from the audio signal processing circuit 212 and supplies the amplified audio signal to the speaker 214. Note that the speaker 214 may be monaural or stereo. In addition, the speaker 214 may be a single speaker or two or more speakers. In addition, the speaker 214 may be an earphone or a headphone. In addition, the speaker 214 may conform to 2.1 channel, 5.1 channel or the like. In addition, the speaker 214 may be wirelessly connected to the television receiver 12. In addition, the speaker 214 may be another device.

The CPU 221 controls operation of each component of the television receiver 12. The flash ROM 222 accommodates control software and stores data. The DRAM 223 constitutes a work area of the CPU 221. The CPU 221 expands software and data read from the flash ROM 222 on the SDRAM 223 to start the software, and controls each component of the television receiver 12.

The remote control receiving unit 226 receives a remote control signal (remote control code) sent from the remote control sender 227, and supplies the remote control code to the CPU 221. The CPU 221 controls each component of the television receiver 12 on the basis of the remote control code. Note that in the present embodiment, a remote control unit is described as a user instruction input unit. However, the user instruction input unit may be another configuration such as, for example, a touch panel unit through which instruction input is performed by proximity/touch, a mouse, a keyboard, a gesture input unit that detects instruction input by means of a camera, and an audio input unit through which instruction input is performed by audio.

The network terminal 225 is a terminal connected to the network and is connected to the Ethernet interface 224. The high speed bus interface 12c, the CPU 221, the flash ROM 222, the SDRAM 223, the Ethernet interface 224, the MPEG decoder 207, and the display control unit 231 are connected to the internal bus 220.

The HDMI receiving unit (HDMI sink) 12b receives, by means of communication that conforms to the HDMI, base-band image (video) and audio data supplied to the HDMI terminal 12a via the HDMI cable 13. The high speed bus interface 12c is similar to the high speed bus interface 11c of the above-mentioned disc player 11, and is an interface for the bidirectional communication channel including a predetermined line (in the present embodiment, the reserve line and the HPD line) constituting the HDMI cable 13.

The high speed bus interface 12c is inserted between the Ethernet interface 224 and the HDMI terminal 201. The high speed bus interface 12c sends sending data supplied from the CPU 221 from the HDMI terminal 12a to an opposite side device via the HDMI cable 13. In addition, the high speed bus interface 12c supplies, to the CPU 221, reception data received from the opposite side device from the HDMI cable 13 via the HDMI terminal 12a.

In a case where the image data received by the HDMI receiving unit 202 are HDR image data, the HDR processing circuit 204 performs a process (decode process) that conforms to the transmission scheme on the HDR image data to generate the HDR image data. In other words, the HDR processing circuit 204 performs the reverse process of the process performed by the HDR processing circuit 114 of the above-mentioned disc player 11, and acquires data constituting the HDR image data. The HDR processing circuit 204 and the HDMI receiving unit 202, or the HDR processing circuit 204 and the video signal processing circuit 208 may be contained in a single chip or configured as a plurality of cores.

In addition, the HDR processing circuit 204 performs a computation to generate the HDR image data from first data including lower 8-bit image data of the HDR image and second data including upper bit image data of the HDR image, or from first data including upper 8-bit image data of the HDR image and second data including lower bit image data of the HDR image.

Note that for example, when the received content data are exported to the network, the content data are output to the network terminal 225 via the Ethernet interface 224. Similarly, when the received content data are exported to the bidirectional communication channel of the HDMI cable 13, the content data are output to the HDMI terminal 12a via the high speed bus interface 12c. Here, before the image data are output, the image data may be encrypted using a copyright protection technology, e.g., HDCP, DTCP, and DTCP+ or the like, to be transmitted.

The operation of the television receiver 12 illustrated in FIG. 6 will be briefly described. The television broadcasting signal input to the antenna terminal 205 is supplied to the digital tuner 206. In the digital tuner 206, the television broadcasting signal is processed, and the predetermined transport stream corresponding to the channel selected by the user is output. The partial TS (TS packet of video data and TS packet of audio data) is then extracted from the transport stream, and the partial TS is supplied to the MPEG decoder 207.

In the MPEG decoder 207, the decode process is performed on the video PES packet including the TS packet of the video data, whereby the video data are obtained. The video data are subjected to, as necessary, the scaling process (resolution conversion process) and the superposing process for graphics data or the like in the video signal processing circuit 208 and the graphic generating circuit 209. After that, the video data are supplied to the panel drive circuit 210. Therefore, an image corresponding to the channel selected by the user is displayed on the display panel 211.

In addition, in the MPEG decoder 207, the decode process is performed on the audio PES packet including the TS packet of the audio data, whereby the audio data are obtained. The audio data are subjected to the necessary process such as the D/A conversion in the audio signal processing circuit 212, and further amplified in the audio amplification circuit 213. After that, the audio data are supplied to the speaker 214. Therefore, audio corresponding to the channel selected by the user is output from the speaker 214.

In addition, the content data (image data and audio data) supplied from the network terminal 225 to the Ethernet interface 224 or supplied from the HDMI terminal 12a via the high speed bus interface 12c are supplied to the MPEG decoder 207. Subsequently, operation similar to the above-mentioned operation performed at the time of receiving the television broadcasting signal is performed, namely, an image is displayed on the display panel 211, and audio is output from the speaker 214.

In addition, in the HDMI receiving unit 12b, the image data and the audio data sent from the disc player 11 coupled to the HDMI terminal 12a via the HDMI cable 13 are acquired. The image data are supplied to the video signal processing circuit 208 via the HDR processing circuit 204. In addition, the audio data are directly supplied to the audio signal processing circuit 212. Subsequently, operation similar to the above-mentioned operation performed at the time of receiving the television broadcasting signal is performed, namely, an image is displayed on the display panel 211, and audio is output from the speaker 214.

Note that in a case where the image data received by the HDMI receiving unit 12b are HDR image data, the process (decode process) that conforms to the transmission scheme is performed by the HDR processing circuit 204 on the HDR image data, whereby the HDR image data are generated. Then, the HDR image data are supplied from the HDR processing circuit 204 to the video signal processing unit 208. In addition, in a case where the HDR image data are supplied to the video signal processing circuit 208, the image data for displaying an HDR image are generated on the basis of the HDR image data, and the gamma correction is performed on the basis of the gamma correction information received at the HDMI receiving unit 12b. Therefore, the HDR image is displayed on the display panel 211.

[Transmission Scheme for HDR Image Data]

Next, the transmission schemes for the HDR image data will be described. To begin with, the following description is based on the premise that HDR image data of an original signal include image data of 8 or more bits. In each of the examples described below, the HDR image data are image data having a pixel format of 1920×1080p as illustrated in FIGS. 7 to 9.

In a case where the original signal is transmitted using a baseband digital interface, for example, the following three transmission schemes are available. These schemes are the most desirable schemes since the transmission can be performed without a deterioration in the quality of the original signal. However, since the transmission band needs to be 1.2 or more times as large as that for the image data having the 8-bit pixel format of 1920×1080p, these schemes are enabled when the transmission band has a margin.

Figure 7:
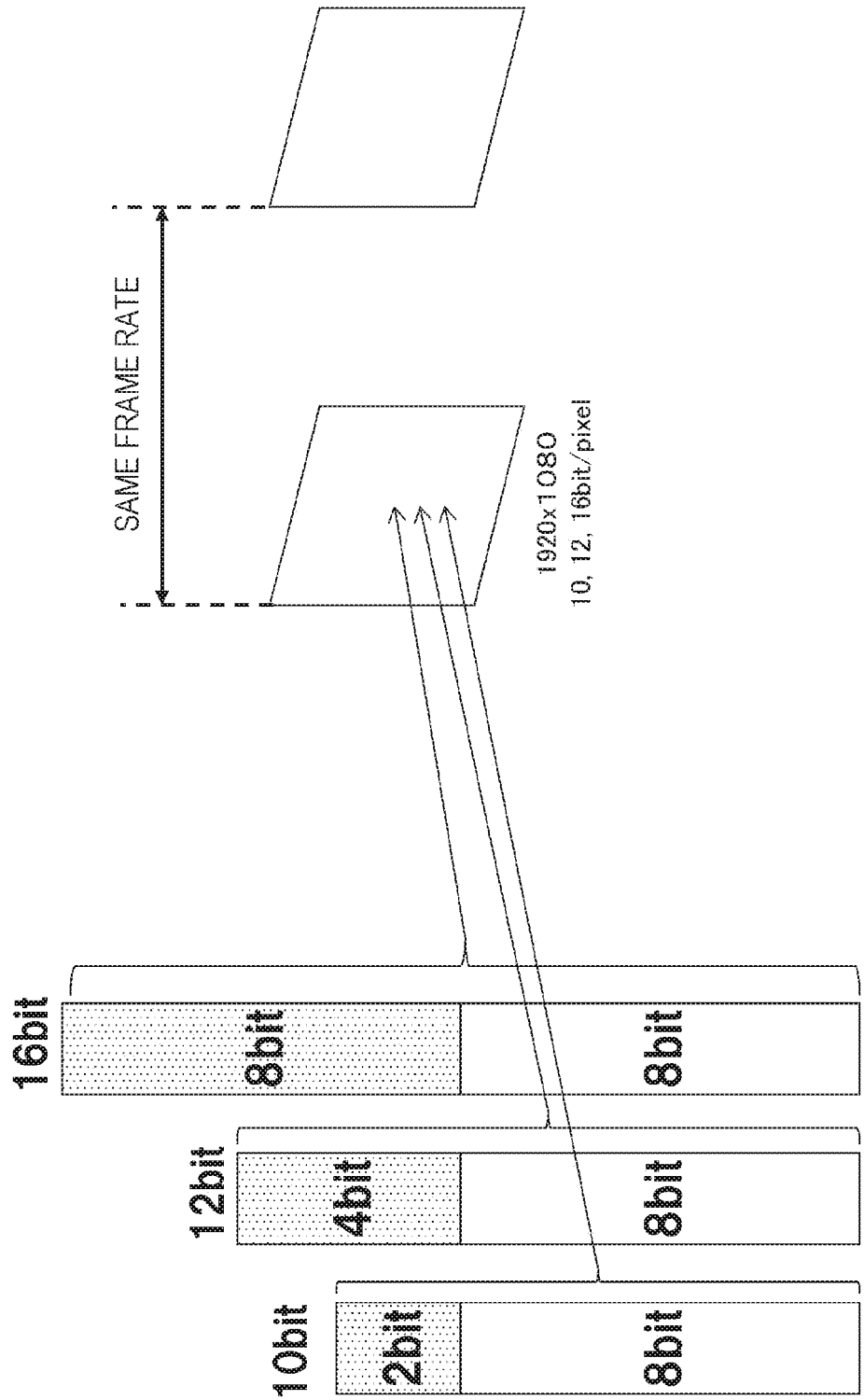
FIG. 7 is a diagram for explaining transmission scheme (1) for transmitting HDR image data by using a deep color transmission format.

Transmission scheme (1) is a scheme for performing the transmission by using the deep color transmission format as illustrated in FIG. 7. In this case, the pixel format of 1920×1080p is selected as the image format, and the HDR image data are transmitted together with information designating bit number per pixel, that is, any one of "DC-48 bit", "DC-36 bit", and "DC-30 bit" to be described later, and newly defined HDR transmission scheme information. In this case, since not all the pieces of pixel data can be transmitted in a single pixel clock, a pixel mapping process is required in the HDR processing circuit 114 or the HDMI sending unit 11b.

Figure 8:
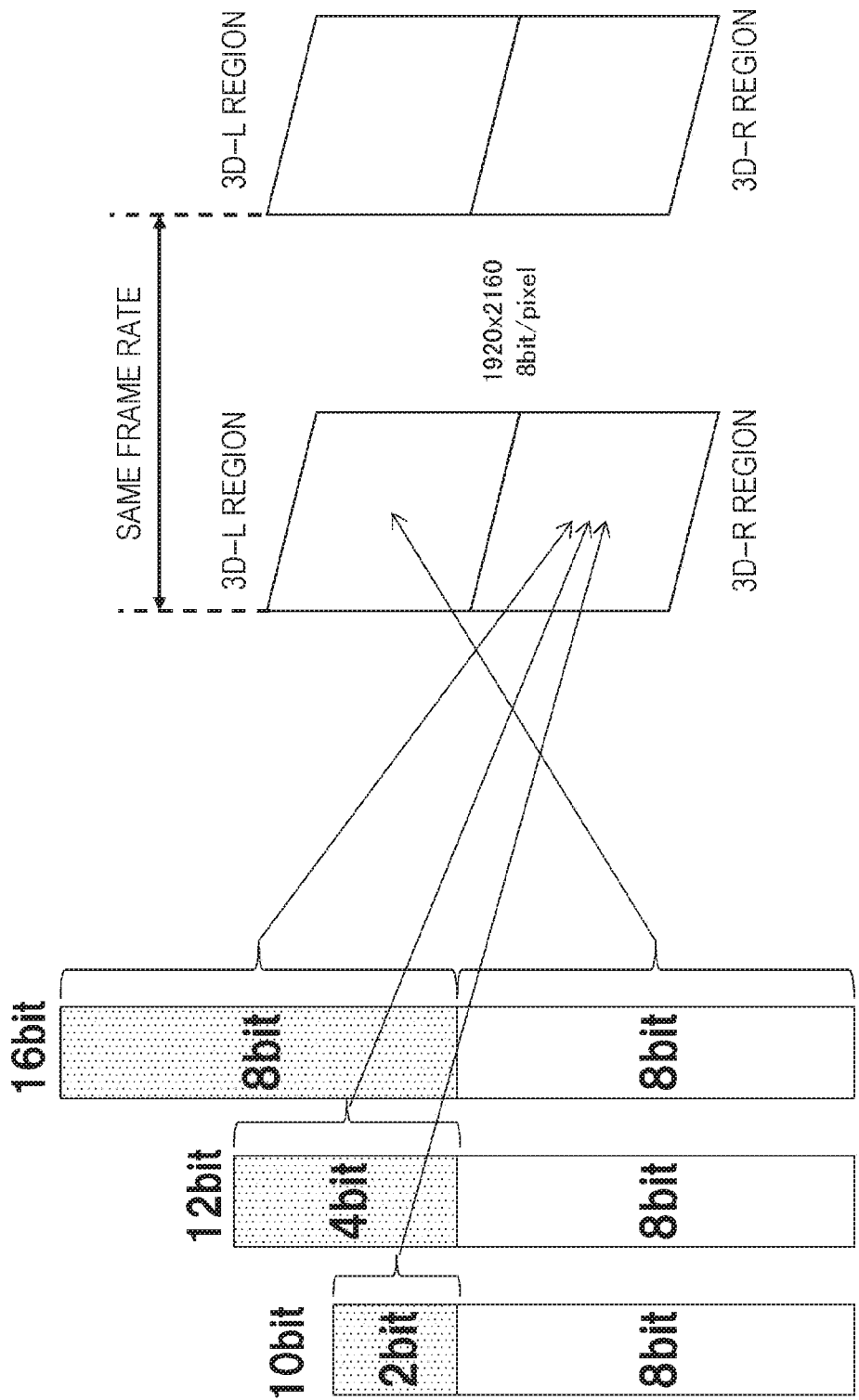
FIG. 8 is a diagram for explaining transmission scheme (2) for transmitting the HDR image data by using a three-dimensional video format.
Figure 9:
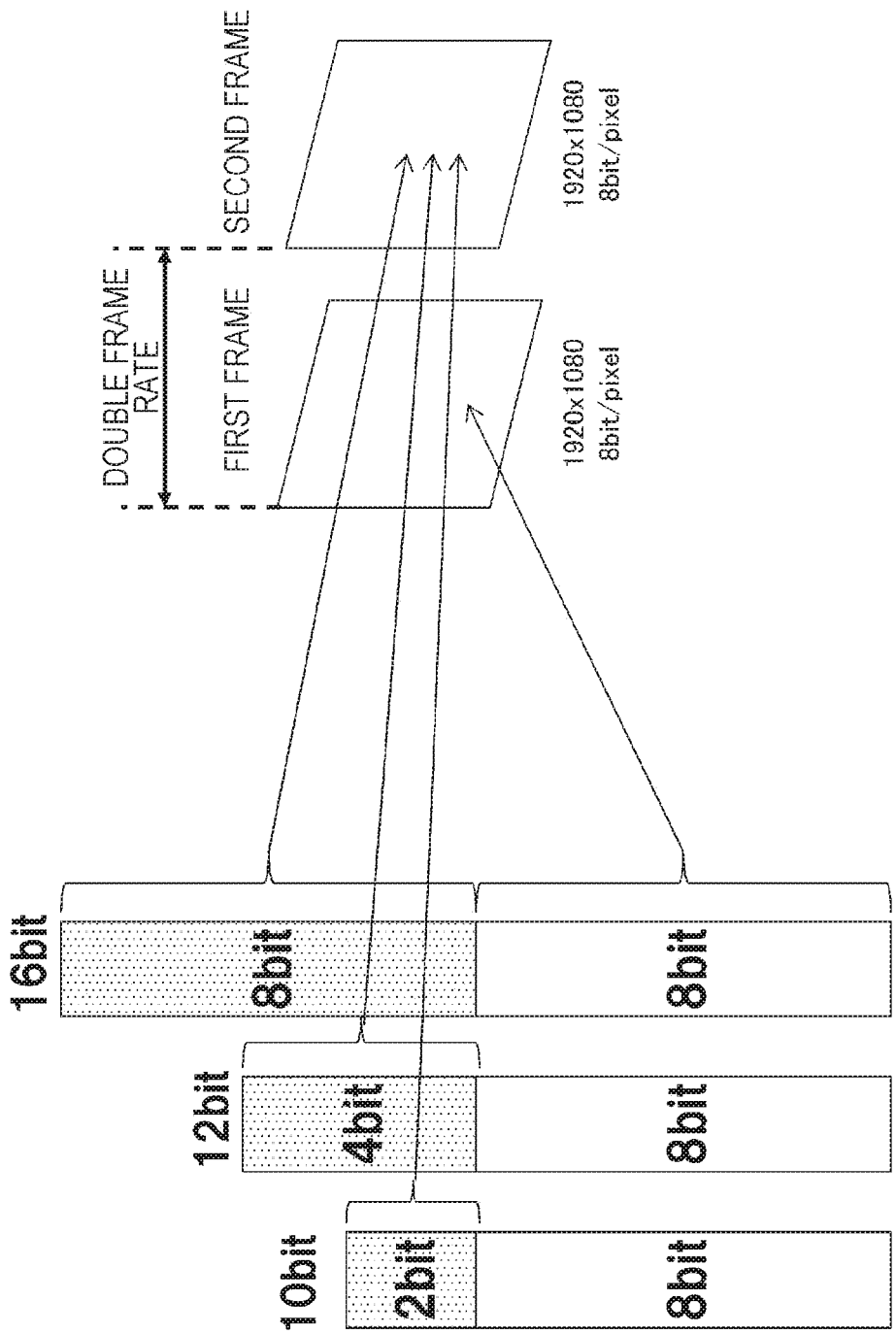
FIG. 9 is a diagram for explaining transmission scheme (3) for transmitting the HDR image data by using a high frame rate video format.

Transmission scheme (2) is a scheme for performing the transmission by arranging the lower 8 bits of the HDR image data in a left-eye image data region of a three-dimensional video format and arranging the remaining upper bits of the HDR image data in a right-eye image data region of the three-dimensional video format as illustrated in FIG. 8. In this case, a video format of 1920×1080p called frame packing is designated as a video format, the three-dimensional video format is not designated, and the HDR image data are transmitted together with newly defined HDR transmission scheme information. In this case, a slice process for the lower 8-bit image data and the upper bit image data and a bit mapping process for a predetermined three-dimensional video format are required in the HDR processing circuit 114.

Note that in the above description, the transmission is performed by arranging the remaining upper bits of the HDR image data in the right-eye image data region of the three-dimensional video format. Specifically, the remaining upper bits of the HD image data are 2 bits, 4 bits, or 8 bits when the HDR image data are 10-bit, 12-bit, or 16-bit image data, respectively. Instead of the remaining upper bits, the transmission may be performed by arranging the upper 8 bits of the HDR image data in the right-eye image data region of the three-dimensional video format.

In addition, in the above description, the transmission is performed by arranging the lower 8 bits of the HDR image data in the left-eye image data region of the three-dimensional video format and arranging the remaining upper bits of the HDR image data in the right-eye image data region of the three-dimensional video format. However, the transmission may be performed by arranging the lower 8 bits of the HDR image data in the right-eye image data region of the three-dimensional video format and arranging the remaining upper bits of the HDR image data in the left-eye image data region of the three-dimensional video format.

In addition, in the above description, the transmission is performed by arranging the lower 8 bits of the HDR image data in the left-eye image data region of the three-dimensional video format and arranging the remaining upper bits of the HDR image data in the right-eye image data region of the three-dimensional video format. However, the transmission may be performed by arranging the upper 8 bits of the HDR image data in the left-eye image data region of the three-dimensional video format and arranging the remaining lower bits of the HDR image data in the right-eye image data region of the three-dimensional video format.

Transmission scheme (3) is a scheme for performing the transmission by arranging the lower 8 bits of the HDR image data in a first frame image data region of a high frame rate and arranging the remaining upper bits of the HDR image data in a second frame image data region as illustrated in FIG. 9. In this case, a high frame rate video format of normal 1920×1080p is designated as the video format, and the HDR image data are transmitted together with newly defined HDR transmission scheme information. In this case, the slice process for the lower 8-bit image data and the upper bit image data and a bit mapping process for a predetermined high frame rate video format are required in the HDR processing circuit 114.

Note that in the above description, the transmission is performed by arranging the remaining upper bits of the HDR image data in the second frame image data region. Specifically, the remaining upper bits of the HD image data are 2 bits, 4 bits, or 8 bits when the HDR image data are 10-bit, 12-bit, or 16-bit image data, respectively. Instead of the remaining upper bits, the transmission may be performed by arranging the upper 8 bits of the HDR image data in the second frame image data region.

In addition, in the above description, the transmission is performed by arranging the lower 8 bits of the HDR image data in the first frame image data region of the high frame rate and arranging the remaining upper bits of the HDR image data in the second frame image data region. However, the transmission may be performed by arranging the lower 8 bits of the DR image data in the second frame image data region of the high frame rate and arranging the remaining upper bits of the HDR image data in the first frame image data region.

In addition, in the above description, the transmission is performed by arranging the lower 8 bits of the HDR image data in the first frame image data region of the high frame rate and arranging the remaining upper bits of the HDR image data in the second frame image data region. However, the transmission may be performed by arranging the upper 8 bits of the HDR image data in the first frame image data region of the high frame rate and arranging the remaining lower bits of the HDR image data in the second frame image data region.

Note that in each of transmission schemes (2) and (3), the HDR processing circuit 204 of the above-mentioned television receiver 12 performs a process of separately extracting the lower 8 bits and the upper bits of the HDR image data or the upper 8 bits and the lower bits from the three-dimensional video format or the high frame rate video format.

[Gamma Correction Scheme for HDR Image Data]

Next, the gamma correction schemes for the HDR image data will be described.

Figure 10:
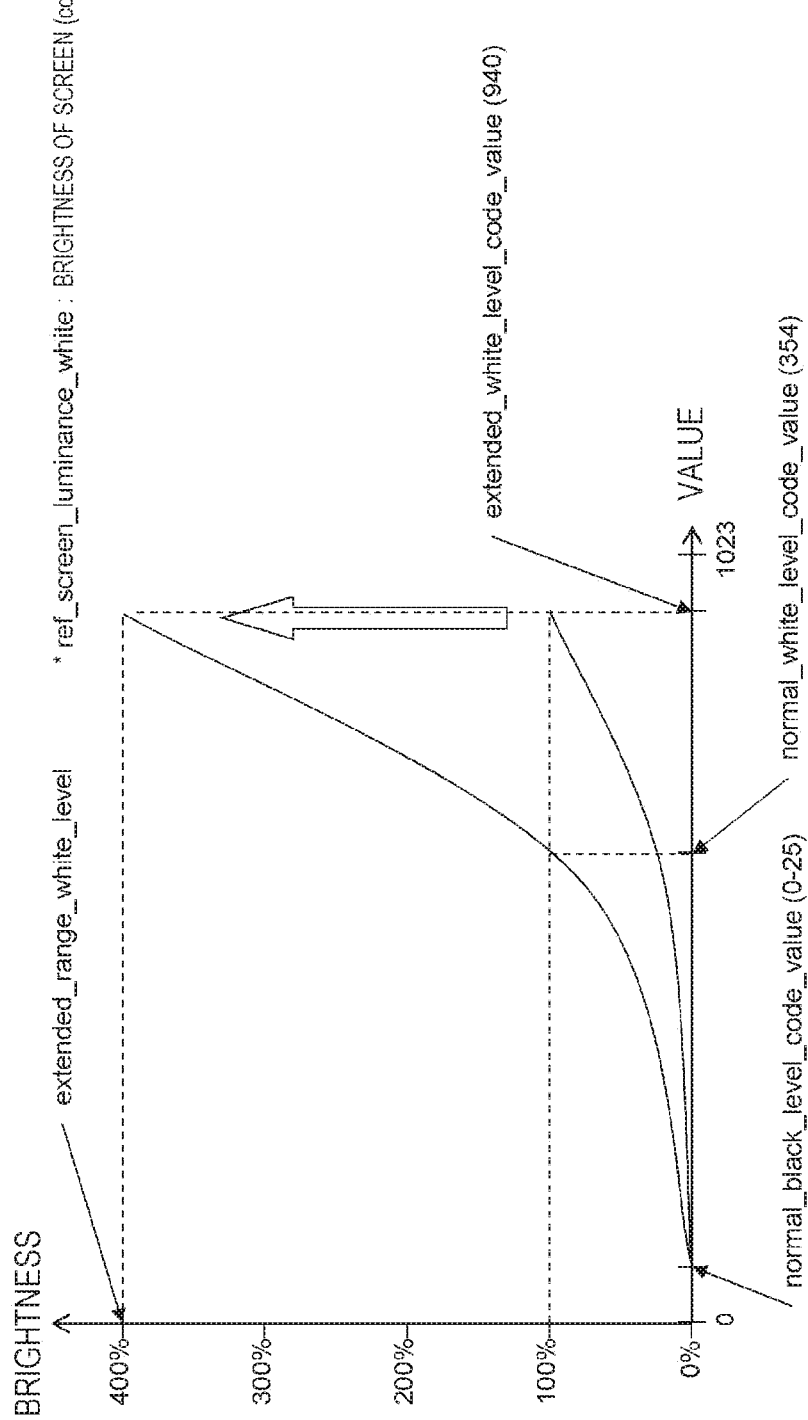
FIG. 10 is a diagram for explaining HDR gamma correction scheme (1).

In gamma correction scheme (1), as illustrated in FIG. 10, a gamma correction curve can be approximated by designating an expected luminance level of the display panel 211 for 100% luminance, a maximum luminance level of the HDR image to be transmitted, a bit value of image data representing 0% luminance, a bit value of image data representing 100% luminance, and a bit value of image data representing a maximum white level expressed in the HDR image. The image correction is performed on the basis of this approximate curve, whereby the expected HDR image can be displayed.

Figure 11:
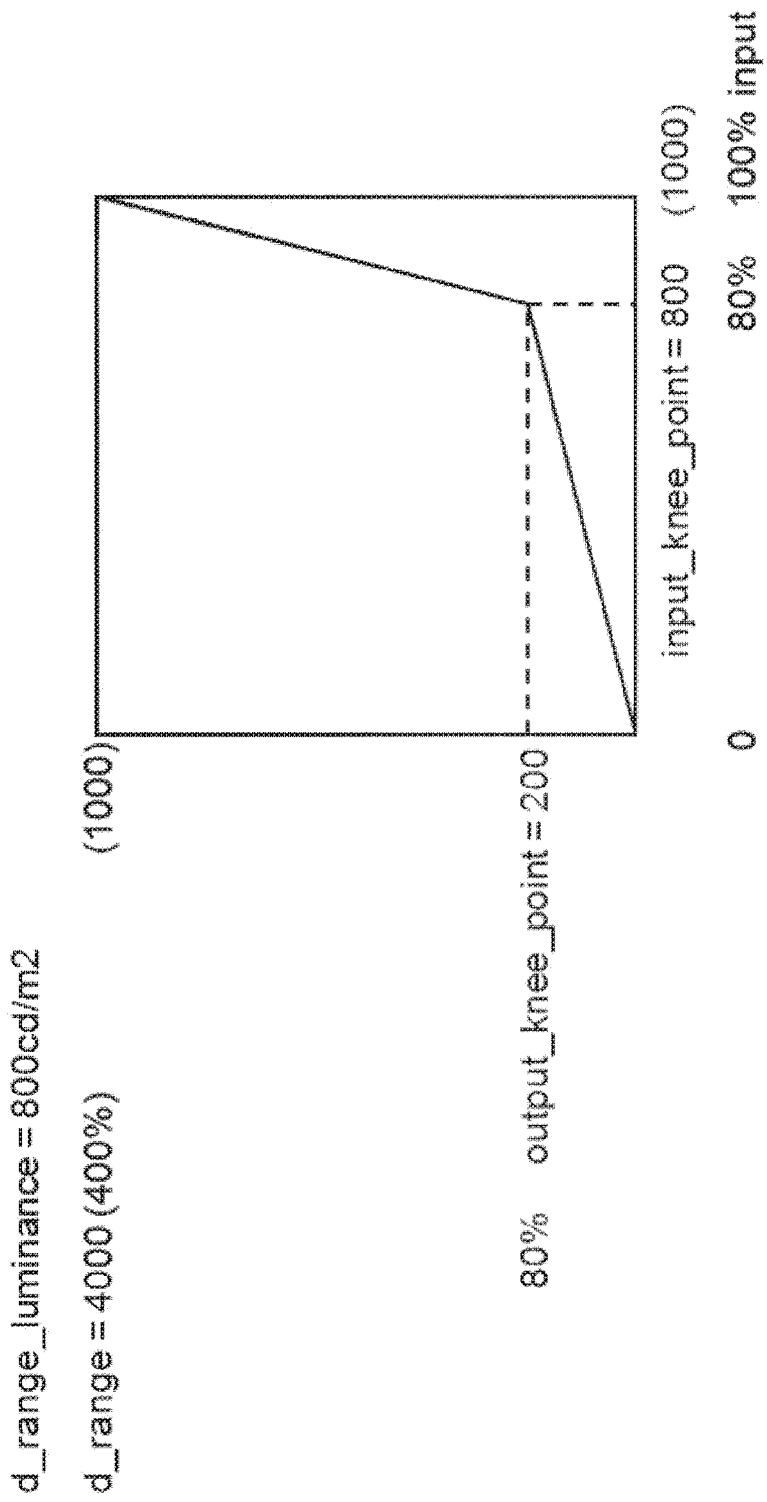
FIG. 11 is a diagram for explaining HDR gamma correction scheme (2).

In gamma correction scheme (2), as illustrated in FIG. 11, a gamma correction curve can be approximated by designating an expected output luminance level of the display panel 211 for a designated luminance input level, a luminance dynamic range value of the HDR image to be transmitted, and a maximum luminance level. The image correction is performed on the basis of this approximate curve, whereby the expected HDR image can be displayed.

In gamma correction scheme (3), as illustrated in FIG. 12, a gamma correction curve can be approximated by designating a luminance level for 100% luminance defined in ITU-R BT.1886, a luminance level for 0% luminance, and a gamma value. The image correction is performed on the basis of this approximate curve, whereby the expected HDR image can be displayed.

Figure 13:
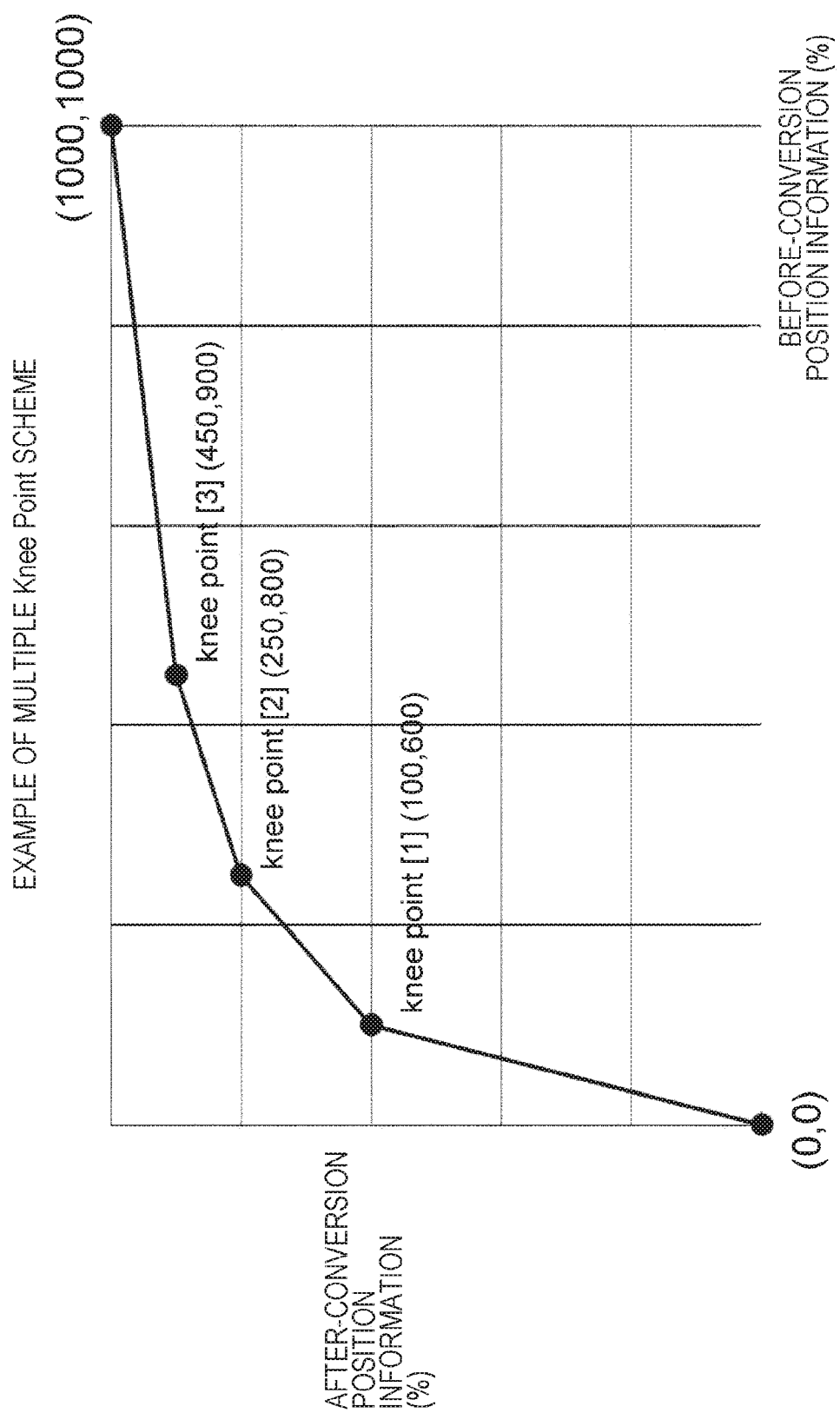
FIG. 13 is a diagram for explaining HDR gamma correction scheme (4).

In gamma correction scheme (4), as illustrated in FIG. 13, a gamma correction curve can be approximated by designating a plurality of expected output luminance level points of the display panel 211 for luminance input levels designated in gamma correction scheme (2). The image correction is performed on the basis of this approximate curve, whereby the expected HDR image can be displayed.

[Exemplary Data Structure of EDID]

Figure 14:
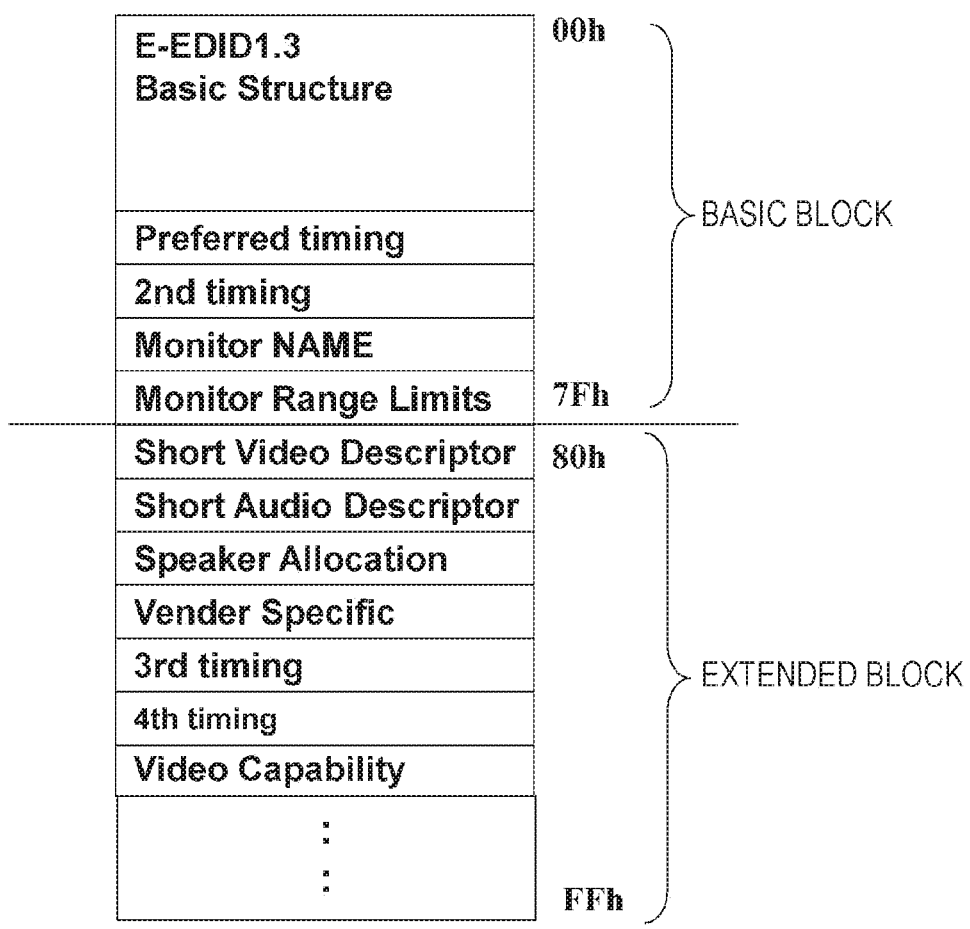
FIG. 14 is a diagram illustrating an exemplary data structure of E-EDID stored in the sink device (television receiver).

FIG. 14 is a diagram illustrating an exemplary data structure of the E-EDID. The E-EDID includes a basic block and an extended block. At the top of the basic block, data represented by "E-EDID 1.3 Basic Structure" defined by a standard of E-EDID 1.3 are arranged. Subsequently, timing information represented by "Preferred timing" for maintaining compatibility with conventional EDID is arranged, and timing information represented by "2nd timing", which is different from the "Preferred timing", for maintaining the compatibility with the conventional EDID is arranged.

In addition, in the basic block, subsequently to the "2nd timing", information represented by "Monitor NAME" indicating a name of a display device, and information represented by "Monitor Range Limits" indicating the number of pixels that can be displayed when an aspect ratio is 4:3 and 16:9 are arranged in order.

At the top of the extended block, data represented by "Short Video Descriptor" describing information such as an image size (resolution) that can be displayed, a frame rate, information as to either an interlace system or a progressive system, and an aspect ratio, data represented by "Short Audio Descriptor" describing information such as an audio codec system that can be reproduced, a sampling frequency, a cutoff band, and codec bit number, and information represented by "Speaker Allocation" about left and right speakers are arranged in order.

In addition, in the extended block, subsequently to the "Speaker Allocation", data represented by "Vender Specific" uniquely defined for each manufacturer, timing information represented by "3rd timing" for maintaining the compatibility with the conventional EDID, timing information represented by "4th timing" for maintaining the compatibility with the conventional EDID, and flag information represented by "Video Capability" (hereinafter referred to as VCDB) which the sink device can deal with for display are arranged.

[Exemplary Data Structure of Vendor Specific Data Block (VSDB) Region]

In the present embodiment, a data area that is extended for storing HDR image information is defined in the VSDB region. FIG. 15 is a diagram illustrating an exemplary data structure of the VSDB region. In the VSDB region, zeroth to N-th blocks, each of which is a 1-byte block, are provided.

In a fourth bit of an eighth byte and (M+1)-th to (M+3)-th bytes subsequent to already defined zeroth to M-th bytes, the data region for the HDR image information that should be stored by the sink device (television receiver 12 in the present embodiment) is defined.

First, the zeroth to eighth bytes will be described. In the zeroth byte arranged at the top of the data represented by the "Vender Specific", a header represented by "Vendor-Specific tag code (=3)" indicating the data region and information represented by "Length (=N)" indicating the length of the VSDB data are arranged. In addition, in the first to third bytes, information represented by "24 bit IEEE Registration Identifier (0x000C03) LSB first" indicating a number "0x000C03" registered for HDMI® is arranged.

Furthermore, in the fourth and fifth bytes, information represented by each of "A", "B", "C", and "D" indicating a physical address of a 24-bit sink device is arranged. In the sixth byte, a flag represented by "Supports-AI" indicating a function which the sink device supports, respective items of information represented by "DC-48 bit", "DC-36 bit", and "DC-30 bit" designating bit number per one pixel, a flag represented by "DC-Y444" indicating whether the sink device supports transmission of an image of YCbCr 4:4:4, and a flag represented by "DVI-Dual" indicating whether the sink device supports a dual digital visual interface (DVI) are arranged.

In addition, in the seventh byte, information represented by "Max-TMDS-Clock" indicating a maximum frequency of the TMDS pixel clock is arranged. In the eighth byte, information designating presence of a latency field, information designating presence of an interlace latency field, information designating presence of extension of a 3D video format, and a flag of information designating support for a function of a content type (CNC) are arranged. In the fourth bit of the eighth byte, a flag indicating whether HDR information which the sink device deals with exists is newly arranged. When this flag is true, it is indicated that the information about the HDR exists in (15+M)-th to (18+M)-th bytes.

Next, the (15+M)-th to (18+M)-th bytes will be described. A seventh bit of the (15+M)-th byte indicates whether a process for the HDR function is prohibited in the source device. In sixth to fourth bits of the (15+M)-th byte, pieces of data indicating the three types of video formats for the HDR image (transmission schemes (1) to (3) mentioned above) which the sink device deals with are written.

If other schemes are proposed, they can be assigned to third to zeroth bits of the (15+M)-th byte. In seventh to fourth bits of the (16+M)-th byte, pieces of data indicating the four types of gamma correction schemes for the HDR image which the sink device deals with are written. If other gamma correction schemes are proposed, they can be assigned to third to zeroth bits of the (16+M)-th byte.

In seventh to fourth bits of the (17+M)-th byte, pieces of data indicating three types of transmission schemes for the gamma correction information for the HDR image which the sink device deals with are written. If other transmission schemes for the gamma correction information are proposed, they can be assigned to fourth to zeroth bits of the (17+M)-th byte.

For example, when the seventh bit is true, a process such as luminance expansion and bit compression for the HDR image is prohibited in the source device. In the (18+M)-th byte, a maximum luminance value of the display panel unit 211 of the sink device is designated using a unit of cd/m$^2$. In the (19+M)-th byte, a maximum luminance expansion level that can be processed in the video signal processing circuit 208 of the sink device is designated using a unit of %. They are used as information of the sink device required for the luminance expansion and bit compression processes or the like for the HDR image that are performed in the source device when "Raw" in the seventh bit of the (15+M)-th byte is false.

In this example, the method of storing the HDR transmission information by using the VSDB region has been proposed. However, since the VSDB region has the HDMI-specific data structure, the compatibility with devices that are based on other specifications cannot be maintained although the compatibility between HDMI devices are ensured. In the data structure of the E-EDID, therefore, a method of storing the HDR transmission information in other data regions such as the VCDB can also be realized for the purpose of maintaining the compatibility regardless of the transmission standard.

[Exemplary Data Structure of Video Capability Data Block (VCDB) Region]

In the present embodiment, a data area that is extended for storing the HDR image information is defined in the VCDB region. FIG. 16 is a diagram illustrating an exemplary data structure of the VCDB region. Zeroth to N-th bytes are provided in the VCDB region.

In "User Extended Tag" ranging from seventh to fifth bits of the zeroth byte, 0x7 indicating an extension tag is arranged. In subsequent fourth to zeroth bits, the byte length excluding the zeroth byte is arranged. In addition, in "Extended Tag Code" of the first byte, "0x0" representing the VCDB is arranged.

In the subsequent second byte, display ranges QY and QS and items of scan information S_PT1 to S_CE0 are arranged. In the subsequent third to eighth bytes, items of information that are the same as those in the (15+M)-th to (21+M)-th bytes of the above-mentioned VSDB region are arranged. The VCDB region is used in this manner, whereby the compatibility can be maintained between different transmission standards. Alternatively, the HDR image information may be stored by designating "0x06" representing "Video Related Code" in "Extended Tag Code" instead of the VCDB region and defining a new packet.

In the AV system 10 illustrated in FIG. 1, the CPU 104 of the disc player (source device) 11 confirms connection of the television receiver (sink device) 12 by means of the HPD line 25 (refer to FIG. 2). After that, the CPU 104 of the disc player 11 reads the E-EDID, namely, the HDR image information, from the television receiver 12 by using the DDC 23 (refer to FIG. 2), and recognizes the transmission schemes, the gamma correction schemes, and the transmission schemes for the gamma correction information for the HDR image which the television receiver 12 deals with.

In the AV system 10 illustrated in FIG. 1, when the HDR image data are transmitted to the television receiver 12, the disc player 11 selects a transmission scheme, a gamma correction scheme, and a transmission scheme for the gamma correction from among the transmission schemes, the gamma correction schemes, and the transmission schemes for the gamma correction information for the HDR image data which the television receiver 12 can deal with on the basis of the HDR image information read from the television receiver 12 in the above-mentioned manner. The disc player 11 then performs the transmission. At this time, the disc player 11 sends information about the currently transmitted HDR image format to the television receiver 12.

In this case, the disc player 11 inserts the information in the blanking interval of the HDR image data (video signal) that are sent to the television receiver 12, whereby the information is sent to the television receiver 12. In this regard, the disc player 11 inserts the information about the currently transmitted image format in the blanking interval of the HDR image data using a vendor specific InfoFrame (hereinafter referred to as "VSIF") packet of the HDMI, auxiliary video InfoFrame (hereinafter referred to as "AVIF"), or newly defined dynamic range InfoFrame (hereinafter referred to as "DRIF"). The VSIF packet, the AVIF packet, and the DRIF packet are arranged in the above-mentioned data island period 18 (refer to FIG. 3).

[Exemplary Data Structure of VSIF Packet]

FIG. 17 is a diagram illustrating an exemplary data structure of the VSIF packet. In the HDMI, supplementary information about the image can be transmitted from the source device to the sink device by means of the VSIF packet. In a zeroth byte, PacketType (0x81) indicating the VSIF packet is defined. In a first byte, a version of the VSIF packet is defined. In fourth to zeroth bits of a second byte, the data length excluding a header part of the VSIF packet is defined. In a third byte, a checksum of the data is defined. In fourth to fifth bytes, information represented by "24 bit IEEE Registration Identifier (0x000C03) LSB first" indicating a number "0x000C03" registered for HDMI® is arranged.

In a sixth bit of a sixth byte, an "HDR" flag indicating whether the transmission information for the HDR image data exists in (8+N)-th and subsequent bytes is designated. When the "HDR" flag is false, it is indicated that no transmission of the HDR image data is performed. When the "HDR" flag is true, the supplementary information about the HDR image is designated in ninth to M-th bytes.

In a seventh bit of an eighth byte, information as to whether the HDR image to be transmitted has been subjected to the process such as the luminance expansion and the luminance compression in the source device is designated. When "Raw" is true, it is indicated that the process such as the luminance expansion has not been performed in the source device. When "Raw" is false, it is indicated that the process such as the luminance expansion has been performed in the source device.

In subsequent sixth to fourth bits, information as to which of the three types (transmission schemes (1) to (3) mentioned above) of transmission schemes (video formats) for the HDR image has been selected is designated. In this case, the sixth to fourth bits are set to 0b001 for transmission scheme (1), set to 0b010 for transmission scheme (2), and set to 0b011 for transmission scheme (3). If other schemes are proposed, they can be assigned to 0b100 to 0b111 of the sixth to fourth bits and third to zeroth bits.

In seventh to fourth bits of a ninth byte, information as to which of the four types (gamma correction schemes (1) to (4) mentioned above) of gamma correction schemes for the HDR image has been selected is designated. In this case, the seventh to fourth bits are set to 0b0001 for gamma correction scheme (1), set to 0b0010 for gamma correction scheme (2), set to 0b0011 for gamma correction scheme (3), and set to 0b0100 for gamma correction scheme (4). If other schemes are proposed, they can be assigned to 0b0101 to 0b1111 of the seventh to fifth bits and fourth to zeroth bits. In tenth to M-th bytes, data of the gamma correction scheme designated in the seventh to fourth bits of the ninth byte are designated.

FIG. 18 is a diagram illustrating a data structure of the gamma correction of gamma correction scheme (1) (refer to FIG. 10). In a zeroth byte, the data length of gamma correction scheme (1), that is, nine, is designated. In first to second bytes, the expected luminance level "Reference_Screen_Luminance_White" of the display panel 211 for the 100% luminance is designated using a unit of cd/m². In third to fourth bytes, the maximum luminance level "Extended_Range_White_Level" of the HDR image to be transmitted is designated using a unit of %.

In a fifth byte, the bit value "Nominal_Black_Level_Code_Value" of the image data representing the 0% luminance level is designated. Since values ranging from 0 to 64 are generally designated, the 1-byte length is employed. In sixth to seventh bytes, the bit value "Nominal_White_Level_Code_Value" of the image data representing the 100% luminance level is designated. In eighth to ninth bytes, the bit value "Extended_White_Level_Code_Value" of the image data representing the maximum white level expressed in the HDR image is designated.

FIG. 10 mentioned above indicates an example of HDR information (1) to be transmitted by means of the AVIF, VSIF, or DRIF packet, namely, the values of "Extended_Range_White_Level", "Nominal_Black_Level_Code_Value", "Nominal_White_Level_Code_Value", and "Extended_White_Level_Code_Value" mentioned above. This example is based on the premise that "Extended_Range_White_Level" is "400" and the bit length is 10 bits.

FIG. 19 is a diagram illustrating a data structure of the gamma correction of gamma correction scheme (2). In a zeroth byte, the data length of gamma scheme (2), that is, 13, is designated. In first to second bytes, the input luminance level "Input_Knee_Point" of scheme (2) is designated using a unit of 0.1%. In third to fourth bytes, the output luminance level "Output_Knee_Point" is designated using a unit of 0.1%.

In fifth to eighth bytes, the dynamic range "Dynamic_Range" of the HDR image to be transmitted is designated using a unit of 0.1%. In ninth to twelfth bytes, the luminance level at the maximum dynamic range "Dynamic_Range_Luminance" is designated using a unit of cd/m².

FIG. 11 mentioned above indicates an example of HDR information (2) to be transmitted by means of the AVIF, VSIF, or DRIF packet, namely, the values of "Input_Knee_Point", "Output_Knee_Point", "Dynamic_Range", and "Dynamic_Range_Luminance" mentioned above.

FIG. 20 is a diagram illustrating a data structure of the gamma correction of gamma scheme (3). In a zeroth byte, the data length of gamma correction scheme (3), that is, four, is designated. In first to second bytes, the luminance level "Screen_Luminance_White_Level" for the 100% luminance is designated using a unit of cd/m². In a third byte, the luminance level "Screen_Luminance_Black_Level" for the 0% luminance level is designated using a unit of cd/m². Since values ranging from 0 to 64 are generally designated, the 1-byte length is employed. In a fourth byte, the gamma value "Gamat_Value" is designated.

FIG. 12 mentioned above indicates an example of HDR information (3) to be transmitted by means of the AVIF, VSIF, or DRIF packet, namely, the calculation formula with the use of "Screen_Luminance_White_Level", "Screen_Luminance_Black_Level", and "Gamat_Value" mentioned above.

FIG. 21 is a diagram illustrating a data structure of the gamma correction of gamma correction scheme (4). In a zeroth byte, the data length (variable length) of gamma scheme (4) is designated. In first to fourth bytes, input image dynamic range information (input_d_range) is designated. In fifth to eighth bytes, input image display maximum luminance information (input_disp_luminance) is designated. In 9th to 12th bytes, output image dynamic range information (output_d_range) is designated. In 13th to 16th bytes, output image display maximum luminance information "output_disp_luminace" is designated.

In a 17th byte, the number of items of knee position information to be transmitted using gamma correction scheme (4) is designated. In 18th and subsequent bytes, before-conversion position information (input_knee_point) and after-conversion position information (output_knee_point) are set for every three bytes. The knee position is a luminance other than zero of a start point of a range of luminance subjected to a knee conversion at the same conversion rate within a dynamic range of the luminance of an image to be encoded. The before-conversion position information is information representing a knee position of the image to be encoded before conversion in a dynamic range conversion. The before-conversion position information is a permillage of the knee position obtained when a maximum value of the luminance of the image to be encoded is assumed to be 1000 permil. The after-conversion position information is information representing a start point of a range of luminance, in an image converted in the dynamic range conversion, corresponding to the range of the luminance having the start point at the knee position and subjected to the knee conversion. More specifically, the after-conversion position information (output_knee_point) is a permillage of the luminance of the converted image corresponding to a knee point obtained when a maximum value of the luminance of the converted image is assumed to be 1000 permil.

FIG. 13 mentioned above indicates an example of HDR information (4) to be transmitted by means of the AVIF, VSIF, or DRIF packet, namely, the values of "input_knee_point(i)" and "output_knee_point(i)" mentioned above. This example has three knee position points, and the values of "input_knee_point(i)" and "output_knee_point(i)" at the three knee position points are "100, 600", "250, 800", and "450, 900".

The sink device (television receiver 12 in the present embodiment) can determine that the HDR image data are transmitted when any of the sixth to fourth bits of the eighth byte is set to be true. Furthermore, the sink device can determine the transmission scheme (video format) in accordance with the values of the sixth to fourth bits.

Specifically, when the sixth to fourth bits are set to 0b001, it is understood that the transmission of the HDR image data is performed using the deep color video format of 1920× 1080p (refer to FIG. 7). In addition, when the sixth to fourth bits are set to 0b010, it is understood that the transmission of the HDR image data is performed using the frame packing three-dimensional video format of 1920×1080p (refer to FIG. 8). In addition, when the sixth to fourth bits are set to 0b011, it is understood that the transmission of the HDR image data is performed using the high frame rate video format of 1920×1080p (refer to FIG. 9).

Moreover, the gamma correction scheme for the HDR image can be determined in accordance with the values of the seventh to fourth bits of the ninth byte. Specifically, when the seventh to fourth bits are set to 0b0001, it is understood that the transmission of the HDR image data is performed using scheme (1) for the gamma correction (refer to FIG. 10). In addition, when the seventh to fourth bits are set to 0b0010, it is understood that the transmission of the HDR image data is performed using scheme (2) for the gamma correction (refer to FIG. 11). In addition, when the seventh to fourth bits are set to 0b0011, it is understood that the transmission of the HDR image data is performed using scheme (3) for the gamma correction (refer to FIG. 12). In addition, when the seventh to fourth bits are set to 0b0100, it is understood that the transmission of the HDR image data is performed using scheme (4) for the gamma correction (refer to FIG. 13).

[Exemplary Data Structure of AVIF Packet]

FIG. 22 is a diagram illustrating an exemplary data structure of the AVIF packet. In the HDMI, the supplementary information about the image can be transmitted from the source device to the sink device by means of the AVIF packet. In a zeroth byte, PacketType (0x82) indicating the AVIF packet is defined. In a first byte, a version of the AVIF packet is defined. In fourth to zeroth bits of a second byte, the data length (0x0D) excluding a header part of the AVIF packet is defined. In a third byte, a checksum of the data is defined. In 4th to 16th bytes, data defined by CEA-861-D are arranged.

In a 6th bit of a 17th byte, an "HDR" flag indicating presence or absence of 18th and subsequent bytes is designated. When the "HDR" flag is false, it is indicated that no transmission of the HDR image data is performed. When the "HDR" flag is true, the supplementary information about the HDR image is designated in 17th to 27th bytes. In a 5th bit, a "VSIF_EXT" flag indicating whether the supplementary information about the HDR image is simultaneously transmitted by the VSIF packet as well.

When the "VSIF_EXT" flag is false, it is indicated that the transmission of the supplementary information about the HDR image is not performed by the VSIF packet. When the "VSIF_EXT" flag is true, it is indicated that the transmission of the supplementary information about the HDR image is performed in the VSIF packet. For example, the information of scheme (4) for the gamma correction may be transmitted by the AVIF packet and the VSIF packet in such a manner that the 0th to 20th bytes of FIG. 21 are transmitted using a plurality of AVIF packets, and the 21st and subsequent bytes of FIG. 21 are transmitted by means of the VSIF packet structure of FIG. 17. The minimum necessary knee position information is transmitted by the AVIF packet, whereby the compatibility can be maintained even in the transmission standards other than the HDMI.

In a 7th bit of an 18th byte, information as to whether the HDR image to be transmitted has been subjected to the process such as the luminance expansion and the luminance compression in the source device is designated. When "Raw" is true, it is indicated that the process such as the luminance expansion has not been performed in the source device. When "Raw" is false, it is indicated that the process such as the luminance expansion has been performed in the source device.

In subsequent sixth to fourth bits, information as to which of the three types (transmission schemes (1) to (3) mentioned above) of transmission schemes (video formats) for the HDR image has been selected is designated. In this case, the sixth to fourth bits are set to 0b001 for transmission scheme (1), set to 0b010 for transmission scheme (2), and set to 0b011 for transmission scheme (3). If other schemes are proposed, they can be assigned to 0b100 to 0b111 of the sixth to fourth bits and third to zeroth bits.

In 7th to 4th bits of a 19th byte, information as to which of the four types (gamma correction schemes (1) to (4) mentioned above) of gamma correction schemes for the HDR image has been selected is designated. In this case, the seventh to fourth bits are set to 0b0001 for gamma correction scheme (1), set to 0b0010 for gamma correction scheme (2), and set to 0b0011 for gamma correction scheme (3). The seventh to fourth bits are set to 0b0100 for gamma correction scheme (4). If other schemes are proposed, they can be assigned to 0b0101 to 0b1111 of the seventh to fourth bits and fourth to zeroth bits.

In 20th to 27th bytes, data of the gamma correction scheme designated in the 7th to 4th bits of the 19th byte are designated. The data formats described in FIGS. 18 to 21 are respectively used for the data of gamma correction schemes (1) to (4).

In some cases, data exceeding the AVIF packet length, namely, 27 bytes, are handled as the data of the gamma correction scheme. When a first piece of data is transmitted, the version described in the first byte is designated to be 0x02, which indicates presence of the successive AVIF packets. In addition, when a final piece of data is transmitted, the version described in the first byte is designated to be 0x01, whereby the end of the successive AVIF packets is declared. Consequently, the data of the gamma correction scheme exceeding 27 bytes can be transmitted.

[Exemplary Data Structure of DRIF Packet]

FIG. 23 is a diagram illustrating an exemplary data structure of the DRIF packet that is newly defined. In the HDMI, the supplementary information about the image can be transmitted from the source device to the sink device by means of the DRIF packet. In a zeroth byte, PacketType (0x86) indicating the DRIF packet is defined. In a first byte, a version of the DRIF packet is defined. In fourth to zeroth bits of a second byte, the data length excluding a header part of the DRIF packet is defined. In a third byte, a checksum of the data is defined.

In a sixth bit of a fourth byte, an "HDR" flag indicating presence or absence of fifth and subsequent bytes is designated. When the "HDR" flag is false, it is indicated that no transmission of the HDR image data is performed. When the "HDR" flag is true, the supplementary information about the HDR image is designated in fifth to M-th bytes.

In a seventh bit of the fifth byte, information as to whether the HDR image to be transmitted has been subjected to the process such as the luminance expansion and the luminance compression in the source device is designated. When "Raw" is true, it is indicated that the process such as the luminance expansion has not been performed in the source device. When "Raw" is false, it is indicated that the process such as the luminance expansion has been performed in the source device.

In subsequent sixth to fourth bits, information as to which of the three types (transmission schemes (1) to (3) mentioned above) of transmission schemes (video formats) for the HDR image has been selected is designated. In this case, the sixth to fourth bits are set to 0b001 for transmission scheme (1), set to 0b010 for transmission scheme (2), and set to 0b011 for transmission scheme (3). If other schemes are proposed, they can be assigned to 0b100 to 0b111 of the sixth to fourth bits and third to zeroth bits.

In seventh to fourth bits of a sixth byte, information as to which of the four types (gamma correction schemes (1) to (4) mentioned above) of gamma correction schemes for the HDR image has been selected is designated. In this case, the seventh to fourth bits are set to 0b0001 for gamma correction scheme (1), set to 0b0010 for gamma correction scheme (2), and set to 0b0011 for gamma correction scheme (3). The seventh to fourth bits are set to 0b0100 for gamma correction scheme (4). If other schemes are proposed, they can be assigned to 0b0101 to 0b1111 of the seventh to fourth bits and fourth to zeroth bits.

In seventh to M-th bytes, data of the gamma correction scheme designated in the seventh to fourth bits of the sixth byte are designated. The data formats described in FIGS. 18 to 21 are respectively used for the data of gamma correction schemes (1) to (4).

Note that the method of transmitting the HDR transmission information using the VSIF packet, the AVIF packet, or the DRIF packet has been proposed in this example. However, the method of transmitting the HDR transmission information is not limited to this method since the transmission can be realized by using other data packets. In addition, the data structures of the VSIF packet, the AVIF packet, and the DRIF packet are only examples, and the data structure is not limited to these data structures since the transmission can be performed with other items of information added.

Figures 24A, 24B:
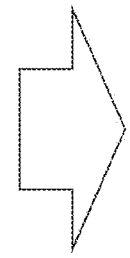
FIGS. 24(a) and 24(b) are diagrams illustrating an exemplary data structure of the gamma correction information set by means of integers and logarithms.

In the example described above, integer values are used for the designation in the data structure for transmitting the HDR transmission information by using the VSIF packet, the AVIF packet, or the DRIF packet. However, a single piece of data of the gamma correction scheme sometimes exceeds 2 bytes. FIG. 24(a) is a diagram illustrating the data structure of "Dynamic_Range" of gamma correction scheme (2) illustrated in FIG. 19. Since the dynamic range "Dynamic_Range" of the HDR image to be transmitted is designated using a unit of 0.1%, 4 bytes need to be ensured for the designation by the integer values. To the contrary, the designation by logarithms requires only 2 bytes since even the dynamic range exceeding 1000% can be represented by 13 bits in total, that is, a 3-bit integer and 10-bit fractions, as illustrated in FIG. 24(b). Consequently, the data length can be shortened.

[Exemplary Process of Selecting HDR Transmission Scheme Performed in Source Device]

Next, an exemplary process of determining the transmission scheme for the HDR image data performed in the disc player (source device) 11 of the AV system 10 illustrated in FIG. 1 will be described with reference to a flowchart in FIG. 25.

The disc player 11 starts the process in step ST1 and thereafter proceeds to a process in step ST2. In step ST2, the disc player 11 determines whether the fourth bit of the eighth byte of the VSDB region of the television receiver (sink device) 12 is at a high level "H". When the fourth bit of the eighth byte is not at a high level "H", the disc player 11 sets data indicating non-transmission of the HDR image in the VSIF packet, the AVIF packet, or the DRIF packet in step ST3. After that, the disc player 11 proceeds to step ST10 and ends the process. In this case, the setting of the data indicating the non-transmission of the HDR image means the setting of "L" in the sixth bit of the seventh byte of the VSIF packet (refer to FIG. 17), the setting of "L" in the sixth bit of the seventeenth byte of the AVIF packet (refer to FIG. 22), or the setting of "L" in the sixth bit of the fourth byte of the DRIF packet (refer to FIG. 23).

When the fourth bit of the eighth byte is at a high level "H" in step ST2, the disc player 11 proceeds to a process in step ST4. In step ST4, the disc player 11 determines whether the seventh bit of the (15+M)-th byte of the VSDB region of the television receiver 12 is at a high level "H". When the seventh bit of the (15+M)-th byte is not at a high level "H", the disc player 11 does not perform the HDR image process and proceeds to next step ST3. The disc player 11 then sets the data indicating the non-transmission of the HDR image. After that, the disc player 11 proceeds to step ST10 and ends the process.

When the seventh bit of the (15+M)-th byte is at a high level "L" in step ST4, the disc player 11 proceeds to next step ST5. In step ST5, the disc player 11 reads the (15+M)-th to (19+M)-th bytes of the VSDB region of the television receiver 12, and proceeds to next step ST6. In step ST6, the disc player 11 determines the transmission scheme for the HDR image on the basis of the transmission scheme information for the HDR image read in step ST5, and proceeds to next step ST7.

In step ST7, the disc player 11 determines the gamma correction scheme and the transmission scheme for the gamma correction information on the basis of the gamma correction schemes for the HDR image described in the seventh to fifth bits of the (16+M)-th byte of the VSDB region of the television receiver (sink device) 12 and the transmission schemes for the gamma correction information described in the seventh to fifth bits of the (17+M)-th byte read in step ST5. The disc player 11 then proceeds to next step ST8.

In step ST8, the disc player 11 sets, in the corresponding packet, the data corresponding to the transmission scheme for the HDR image determined in step ST6 and the gamma correction scheme and the transmission scheme for the gamma correction information determined in step ST7. The disc player 11 then proceeds to next step ST9.

In step ST9, the disc player 11 performs the luminance compression process for the HDR image to be transmitted on the basis of the data of the maximum luminance (cd/m$^2$) of the display panel 211 described in the (18+M)-th byte and the maximum luminance extension level (%) described in the (19+M)-th byte read in step ST5, and starts the transmission. After that, the disc player 11 proceeds to step ST10 and ends the process.

[Exemplary Process of Selecting HDR Metadata Transmission Scheme Performed in Source Device]

Figure 26:
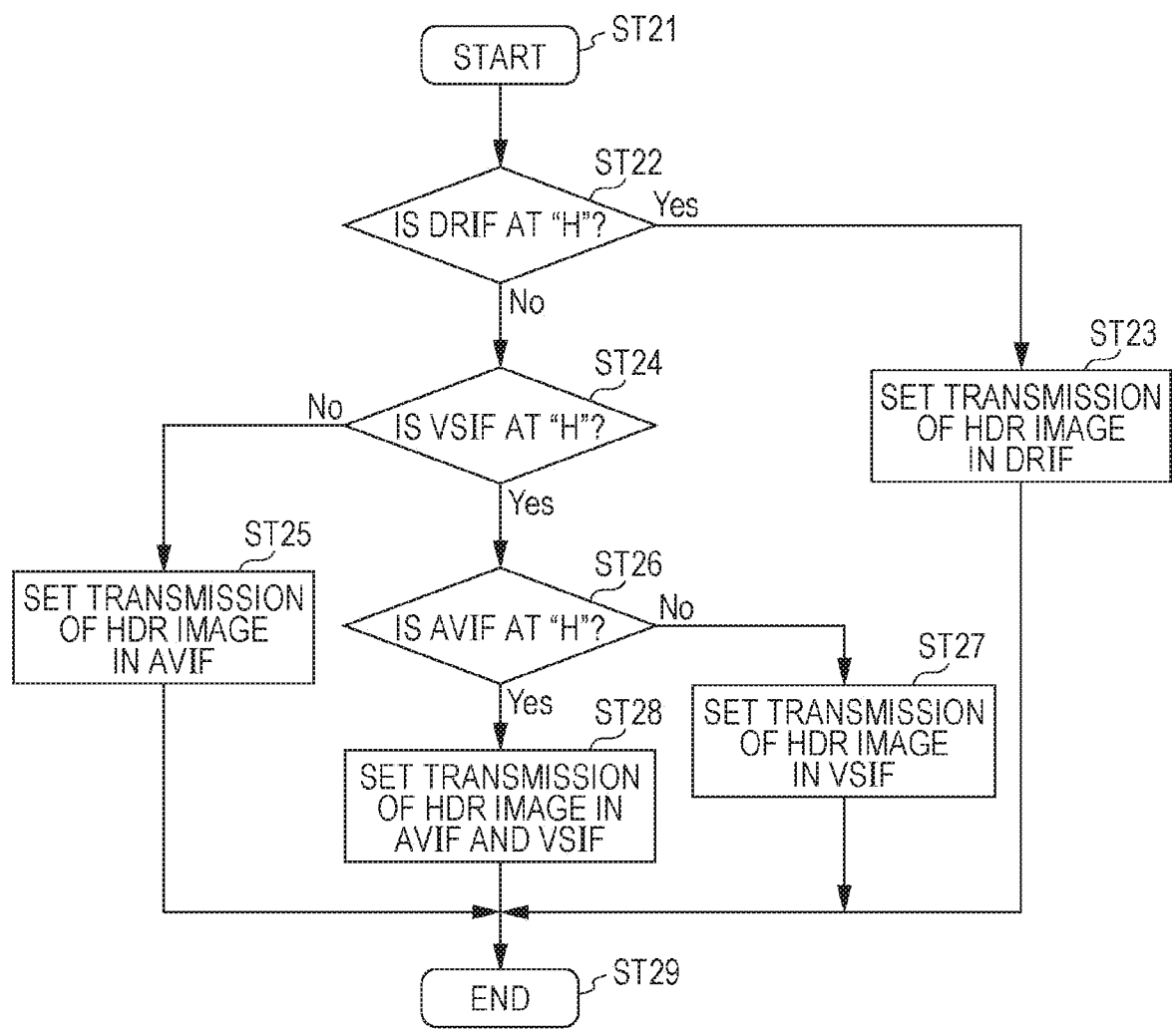
FIG. 26 is a flowchart illustrating an exemplary process of selecting a transmission scheme for the HDR gamma correction information performed in the source device (disc player).

Next, an exemplary process of determining the transmission scheme for HDR metadata of the HDR image data performed in the disc player (source device) 11 of the AV system 10 illustrated in FIG. 1 will be described with reference to a flowchart in FIG. 26. This process indicates a detail of the process of determining the transmission scheme for the gamma correction information performed in step ST7 of FIG. 25.

The disc player 11 starts the process in step ST21 and thereafter proceeds to a process in step ST22. In step ST22, the disc player 11 determines whether the fifth bit of the (17+M)-th byte of the VSDB region of the television receiver (sink device) 12 is at a high level "H".

When the fifth bit of the (17+M)-th byte is at a high level "H", the disc player 11 sets the gamma correction information for the HDR image in the DRIF packet in step ST23. After that, the disc player 11 proceeds to step ST29 and ends the process. In this case, the setting of the gamma correction information for the HDR image means the setting of predetermined data in the DRIF packet (refer to FIG. 23).

When the fifth bit of the (17+M)-th byte is not at a high level "H" in step ST22, the disc player 11 proceeds to a process in step ST24. In step ST24, the disc player 11 determines whether the seventh bit of the (17+M)-th byte of the VSDB region of the television receiver 12 is at a high level "H". When the seventh bit of the (17+M)-th byte is not at a high level "H", the disc player 11 proceeds to next step ST25 and sets the gamma correction information for the HDR image in the AVIF packet in step ST25. After that, the disc player 11 proceeds to step ST29 and ends the process. In this case, the setting of the gamma correction information for the HDR image means the setting of predetermined data in the AVIF packet (refer to FIG. 22).

When the seventh bit of the (17+M)-th byte is at a high level "H" in step ST24, the disc player 11 proceeds to next step ST26. In step ST26, the disc player 11 determines whether the sixth bit of the (17+M)-th byte of the VSDB region of the television receiver 12 is at a high level "H". When the sixth bit of the (17+M)-th byte is not at a high level "H", the disc player 11 proceeds to next step ST27 and sets the gamma correction information for the HDR image in the VSIF packet in step ST27. After that, the disc player 11 proceeds to step ST29 and ends the process. In this case, the setting of the gamma correction information for the HDR image means the setting of predetermined data in the VSIF packet (refer to FIG. 17).

When the sixth bit of the (17+M)-th byte is at a high level "H" in step ST26, the disc player 11 proceeds to a process in step ST28. In step ST28, the disc player 11 sets the gamma correction information for the HDR image in the AVIF packet and the VSIF packet. After that, the disc player 11 proceeds to step ST29 and ends the process. In this case, the setting of the gamma correction information for the HDR image means the setting of predetermined data in the AVIF packet (refer to FIG. 22) and the VSIF packet (refer to FIG. 17).

As described above, in the AV system 10 illustrated in FIG. 1, the HDR image data are sent from the disc player 11 to the television receiver 12 via the HDMI cable 13, and the transmission scheme information and the gamma correction information for the HDR image data are sent via the same HDMI cable 13, whereby the HDR image data can be successfully transmitted. For example, the television receiver 12 can appropriately process the received HDR image data on the basis of the received transmission scheme information and gamma correction information.

In addition, in the AV system 10 illustrated in FIG. 1, the schemes which the television receiver 12 can deal with are selected in the disc player 11 as the transmission scheme and the gamma correction scheme for the HDR image data. Therefore, the decode process and the gamma correction process for the received HDR image data can be reliably performed in the television receiver 12. Consequently, the HDR image data can be successfully transmitted between the disc player 11 and the television receiver 12.

2. Variation

Note that in the above-mentioned embodiment, the disc player 11 sends the transmission scheme information and the gamma correction information for the HDR image data to the television receiver 12 by inserting the transmission scheme information and the gamma correction information for the HDR image data in the blanking interval of the image data (video signal) using the VSIF packet, the AVIF packet, the DRIF packet or the like.

For example, the disc player 11 may send the transmission scheme information and the gamma correction information for the HDR image data to the television receiver 12 via the CEC line 24 that is a control data line of the HDMI cable 13. Alternatively, for example, the disc player 11 may send the transmission scheme information and the gamma correction information for the HDR image data to the television receiver 12 via the bidirectional communication channel including the reserve line 27 and the HPD line 25 of the HDMI cable 13.

In addition, in the above-mentioned embodiment, the E-EDID of the television receiver 12 includes the transmission scheme information, the gamma correction scheme information, and the transmission scheme information for the gamma correction information for the HDR image data which the television receiver 12 deals with. The disc player 11 reads the E-EDID via the DDC 23 of the HDMI cable 13, thereby acquiring the transmission scheme information, the gamma correction scheme information, and the transmission scheme information for the gamma correction information for the HDR image data which the television receiver 12 deals with.

However, the disc player 11 may receive, from the television receiver 12, the transmission scheme information, the gamma correction scheme information, and the transmission scheme information for the gamma correction information for the HDR image data which the television receiver 12 deals with via the CEC line 24, namely, the control data line of the HDMI cable 13, or via the bidirectional communication channel including the reserve line 27 and the HPD line 25 of the HDMI cable 13.

In addition, in the example described in the above-mentioned embodiment, the disc player 11 sends, to the television receiver 12, the transmission scheme information and the gamma correction information for the HDR image data together with the transmission scheme information for the gamma correction information. However, either one may be sent.

In addition, the HDMI transmission line is used in the above-mentioned embodiment. However, examples of the baseband digital interface include, in addition to the HDMI, a mobile high-definition link (MHL), a digital visual interface (DVI) interface, a display port (DP) interface, an optical interface, and a wireless interface that utilizes a 60-GHz millimeter wave. The present technology can be similarly applied when the HDR image data are transmitted by each of these digital interfaces.

[Exemplary Structure of DP System]

FIG. 27 is a diagram illustrating an exemplary configuration of a DP system 300 with the use of the DP interface. In the DP system 300, a DP sending device 301 and a DP receiving device 307 are coupled to each other by a DP cable 303. Then, the DP sending device 301 includes a DP sending unit 302, and the DP receiving device 307 includes a DP receiving unit 308 and a storage unit 309.

The DP cable 303 includes a main link 304, an AUX channel 305, and a hot plug detector 306. The main link 304 includes one, two, or four pairs of doubly terminated differential signals (pair lanes) and does not have a dedicated clock signal. Instead, a clock is embedded in an 8 B/10 B encoded data stream.

The DP interface is different from the HDMI in that the transmission rate and the pixel frequency are independent, and presence or absence of additional data and the amount thereof can be freely adjusted. Examples of the additional data include the depth or resolution of the pixel, the frame frequency, and audio data or DRM information within a transfer stream. The main link 304 is used to transmit the HDR image data together with the transmission scheme information and the gamma correction information for the HDR image data.

The HDMI TMDS transmission data structure (refer to FIG. 3) is used as a transmission data structure for the DP interface, and the HDMI image data structures illustrated in FIGS. 7 to 9 are used for the HDR image data. In addition, a packet including the same data structure as the VSIF packet (refer to FIG. 17), the AVIF packet (refer to FIG. 22), or the DRIF packet (refer to FIG. 23), which is inserted and transmitted in the HDMI data island period 18 (refer to FIG. 3), is used for the transmission scheme information and the gamma correction information for the HDR image data.

The DP sending device 301 confirms connection of the DP receiving device 307 by means of the hot plug detector 306. After that, the DP sending device 301 reads the HDR image information of the E-EDID from the storage unit 309 of the DP receiving device 307 by using the AUX channel 305, and recognizes the transmission schemes for the HDR image which the DP receiving device 307 deals with. The data structure of the HDR image information of the E-EDID in the DP receiving device 307 may be the same as that of FIGS. 14 and 15.

In addition, separately from the main link 304, the DP interface includes the half-duplex bidirectional AUX channel 305 having a bandwidth of 1 Mbit/second or a bandwidth of 720 Mbit/second. Functional information is exchanged between the sending device and the receiving device by means of the bidirectional communication. The transmission scheme information, the gamma correction scheme information, and the transmission scheme information for the gamma correction information for the HDR image data can also be transmitted using the AUX channel 305.

[Exemplary Structure of MHL System]

FIG. 28 is a diagram illustrating an exemplary configuration of an MHL system 400 with the use of the MHL interface. In the MHL system, an MHL sending device 401 and an MHL receiving device 408 are coupled to each other by an MHL cable 404. Then, the MHL sending device 401 includes a TMDS sending unit 402 and a storage unit 403, and the MHL receiving device 408 includes a TMDS receiving unit 409, a storage unit 410, and an EDID-ROM 411.

The MHL cable 404 includes a TMDS channel 405, an MHL link control bus (CBUS)/enhanced MHL link control bus (eCBUS) line 406, and a power supply MHL voltage bus (VBUS) line 407. The TMDS channel 405 includes a pair of differential signals, and the HDR image data are transmitted together with the transmission scheme information and the gamma correction information for the HDR image data and the transmission scheme information therefor.

The HDMI TMDS transmission data structure (refer to FIG. 3) is used as a transmission data structure for the MHL interface, and the HDMI image data structures illustrated in FIGS. 7 to 9 are used for the HDR image data. In addition, a packet including the same data structure as the VSIF packet (refer to FIG. 17), the AVIF packet (refer to FIG. 22), or the DRIF packet (refer to FIG. 23), which is inserted and transmitted in the HDMI data island period 18 (refer to FIG. 3), is used for the transmission scheme information and the gamma correction information for the HDR image data.

In the CBUS/eCBUS line 406, the HPD represents a high level "1" when a data part of packet data is set to 0x64, and the HPD represents a low level "0" when the data part of the packet data is set to 0x65. In this manner, the MHL sending device 401 confirms connection of the MHL receiving device 408 by means of the CBUS/eCBUS line 406.

After that, the MHL sending device 401 reads the HDR image information of the E-EDID from the MHL receiving device 408 by using the CBUS/eCBUS line 406, and recognizes the transmission schemes for the HDR image which the MHL receiving device 408 deals with. The data structure of the HDR image information of the E-EDID in the MHL receiving device 408 may be the same as that of FIGS. 14 and 15.

In addition, in the example of the above-mentioned embodiment, the disc player 11 is used as a sending device (source device), and the television receiver 12 is used as a receiving device (sink device). Needless to say, however, the present technology can be similarly applied when other sending devices and receiving devices are used.

In addition, the present technology can also be configured as follows.

(1) A sending device including:
a data sending unit configured to send high dynamic range image data to an external device; and
an information sending unit configured to send, to the external device, transmission scheme information and/or gamma correction information for the high dynamic range image data that are sent by the data sending unit.

(2) The sending device according to (1), wherein
the data sending unit sends the high dynamic range image data to the external device using a differential signal.

(3) The sending device according to (2), wherein
the information sending unit sends, to the external device, the transmission scheme information and/or the gamma correction information for the high dynamic range image data that are sent by the data sending unit by inserting the transmission scheme information and/or the gamma correction information in a blanking interval of the high dynamic range image data.

(4) The sending device according to any of (1) to (3), wherein the transmission scheme information and the gamma correction information for the high dynamic range image data that are sent by the data sending unit include at least one of information about a maximum white level of the high dynamic range image data exceeding 100%, a bit value for expression of a black level, a bit value for expression of a 100% white level, a flag indicating whether a high dynamic range process is performed, a receiving device luminance level expected for the 100% white level, a luminance input level required for luminance expansion for a high dynamic range image, and an expansion luminance output level required for the luminance expansion for the high dynamic range image.

(5) The sending device according to any of (1) to (4), further including:

an information receiving unit configured to receive transmission scheme information and/or gamma correction scheme information for the high dynamic range image data which the external device is capable of dealing with, the transmission scheme information and/or the gamma correction scheme information being sent from the external device; and a scheme selecting unit configured to select a predetermined transmission scheme and/or gamma correction scheme from among transmission schemes and/or gamma correction schemes for the high dynamic range image data which the external device is capable of dealing with on the basis of the transmission scheme information and/or the gamma correction scheme information received at the information receiving unit, wherein the data sending unit sends, to the external device, the high dynamic range image data conforming to the transmission scheme and/or the gamma correction scheme selected by the scheme selecting unit.

(6) The sending device according to (5), wherein the information receiving unit further receives transmission scheme information for the transmission scheme information and/or the gamma correction information for the high dynamic range image data, the transmission scheme information being sent from the external device, and the information sending unit sends, to the external device, the transmission scheme information and/or the gamma correction information for the high dynamic range image data using a transmission scheme indicated by the transmission scheme information received at the information receiving unit.

(7) The sending device according to any of (1) to (6), wherein the high dynamic range image data include first data and second data, and the data sending unit constructs the first data and the second data using a video format defined for a three-dimensional image, and sends the first data and the second data to the external device.

(8) The sending device according to any of (1) to (6), wherein the high dynamic range image data include first data and second data, and the data sending unit sends the first data to the external device as a first frame image, and sends the second data to the external device as a second frame image.

(9) The sending device according to any of (1) to (6), wherein the high dynamic range image data include first data and second data, and the first data are lower 8-bit data of the high dynamic range image data, and the second data are upper bit data of the high dynamic range image data, or the first data are upper 8-bit data of the high dynamic range image data, and the second data are lower bit data of the high dynamic range image data.

(10) A method of sending high dynamic range image data, the method including:

a data sending step of sending high dynamic range image data to an external device; and an information sending step of sending, to the external device, transmission scheme information and/or gamma correction information for the high dynamic range image data that are sent in the data sending step.

(11) A program that causes a computer to function as:

data sending means configured to send high dynamic range image data to an external device; and an information sending means configured to send, to the external device, transmission scheme information and/or gamma correction information for the high dynamic range image data that are sent by the data sending means.

(12) A receiving device including:

a data receiving unit configured to receive, from an external device, high dynamic range image data for displaying a high dynamic range image;

an information receiving unit configured to receive, from the external device, transmission scheme information and/or gamma correction information for the high dynamic range image data that are received at the data receiving unit; and a data processing unit configured to process the high dynamic range image data received at the data receiving unit on the basis of the transmission scheme information and/or the gamma correction information received at the information receiving unit.

(13) The receiving device according to (12), wherein the data receiving unit receives the high dynamic range image data from the external device using a differential signal.

(14) The receiving device according to (13), wherein the information receiving unit extracts the transmission scheme information and/or the gamma correction information for the high dynamic range image data from a blanking interval of the high dynamic range image data received at the data receiving unit.

(15) The receiving device according to any of (12) to (14), further including:

an information storage unit configured to store transmission scheme information and/or gamma correction scheme information for the high dynamic range image data which the receiving device is capable of dealing with; and an information sending unit configured to send, to the external device, the transmission scheme information and/or the gamma correction scheme information stored in the information storage unit.

(16) The receiving device according to (15), wherein the information storage unit further stores transmission scheme information for the transmission scheme information and/or the gamma correction information for the high dynamic range image data, and the information sending unit further sends, to the external device, the transmission scheme information for the transmission scheme information and/or the gamma correction information for the high dynamic range image data stored in the information storage unit.

(17) The receiving device according to (15) or (16), wherein
the information storage unit further stores at least one of information about a maximum luminance capable of being displayed, information about a maximum expansion luminance level capable of undergoing a high dynamic range process, and an expansion process prohibition flag.

(18) A method of receiving high dynamic range image data, the method including:
a data receiving step of receiving, by a data receiving unit, the high dynamic range image data from an external device;
an information receiving step of receiving, from the external device, transmission scheme information and/or gamma correction information for the high dynamic range image data received in the data receiving step; and
a data processing step of processing the high dynamic range image data received in the data receiving step on the basis of the transmission scheme information and/or the gamma correction information received in the information receiving step.

(19) A program that causes a computer to function as:
a data receiving means configured to receive, from an external device, high dynamic range image data for displaying a high dynamic range image;
an information receiving means configured to receive, from the external device, transmission scheme information and/or gamma correction information for the high dynamic range image data that are received at the data receiving means; and
a data processing means configured to process the high dynamic range image data received at the data receiving means on the basis of the transmission scheme information and/or the gamma correction information received at the information receiving means.

REFERENCE SIGNS LIST

10 AV system
11 Disc player
11a HDMI terminal
11b HDMI sending unit
11c High speed bus interface
12 Television receiver
12a HDMI terminal
12b HDMI receiving unit
12c High speed bus interface
13 HDMI cable
14 Valid image period
15 Horizontal blanking period
16 Vertical blanking period
17 Video data period
18 Data island period
19 Control period
21 HDMI transmitter
22 HDMI receiver
23 DDC line
24 CEC line
25 HPD line
26 Power source line
27 Reserve line
104 CPU
105 Internal bus
106 Flash ROM
107 SDRAM
108 Remote control receiving unit
109 Remote control sender
110 SATA interface
111 BD drive
112 Ethernet interface
113 Network terminal
114 HDR processing circuit
115 MPEG decoder
116 Graphic generating circuit
117 Video output terminal
118 Audio output terminal
121 Display control unit
122 Panel drive circuit
123 Display panel
124 Power source unit
204 HDR processing circuit
205 Antenna terminal
206 Digital tuner
207 MPEG decoder
208 Video signal processing circuit
209 Graphic generating circuit
210 Panel drive circuit
211 Display panel
212 Audio signal processing circuit
213 Audio amplification circuit
214 Speaker
220 Internal bus
221 CPU
222 Flash ROM
223 DRAM
224 Ethernet interface
225 Network terminal
226 Remote control receiving unit
227 Remote control sender
231 Display control unit
232 Power source unit
300 DP system
301 DP sending device
302 DP sending unit
303 DP cable
304 Main link
305 AUX channel
306 Hot plug detector
307 DP receiving device
308 DP receiving unit
309 Storage unit
400 MHL system
401 MHL sending device
402 TMDS sending unit
403 Storage unit
404 MHL cable
405 TMDS channel
406 CBUS/eCBUS line
407 VBUS line
408 MHL receiving device
409 TMDS receiving unit
410 Storage unit
411 EDID ROM

The invention claimed is:
1. A sending device, comprising:
circuitry configured to:
  receive first transmission scheme information for high dynamic range image data from an external device, wherein the external device is compatible with the first transmission scheme information;
  select a first transmission scheme, for transmission of the high dynamic range image data, from a plurality of transmission schemes based on the received first transmission scheme information, wherein the first transmission scheme information corresponds to an arrangement of a plurality of bits associated with the high dynamic range image data, and the first transmission scheme causes least image deterioration among the plurality of transmission schemes;

send the high dynamic range image data to the external device based on the selected first transmission scheme; and send, to the external device, at least one of second transmission scheme information for the high dynamic range image data or first gamma correction information for the high dynamic range image data.

2. The sending device according to claim 1, wherein the circuitry is further configured to send the high dynamic range image data to the external device by use of a differential signal.

3. The sending device according to claim 2, wherein the circuitry is further configured to insert the at least one of the second transmission scheme information or the first gamma correction information in a blanking interval of the high dynamic range image data.

4. The sending device according to claim 1, wherein the at least one of the second transmission scheme information or the first gamma correction information for the high dynamic range image data includes at least one of:
information associated with a maximum white level of the high dynamic range image data, wherein the maximum white level is one of equal to or greater than 100%,
a bit value for expression of a black level,
a bit value for expression of a 100% white level,
a flag that indicates a high dynamic range process,
a receiving device luminance level for the 100% white level,
a luminance input level for luminance expansion for a high dynamic range image, or
an expansion luminance output level for the luminance expansion for the high dynamic range image.

5. The sending device according to claim 1, wherein the circuitry is further configured to:
receive gamma correction scheme information for the high dynamic range image data,
wherein the external device is compatible with the gamma correction scheme information;
select a gamma correction scheme from a plurality of gamma correction schemes, based on the gamma correction scheme information; and
send, to the external device, the high dynamic range image data conforming to at least one of the first transmission scheme or the gamma correction scheme.

6. The sending device according to claim 5, wherein the circuitry is further configured to:
receive third transmission scheme information for second gamma correction information; and
send, to the external device, at least one of fourth transmission scheme information for the second gamma correction information or the first gamma correction information based on a second transmission scheme indicated by the received third transmission scheme information.

7. The sending device according to claim 1, wherein the circuitry is further configured to:
construct first data and second data based on a video format defined for a three-dimensional image, wherein the high dynamic range image data include the first data and the second data; and send the first data and the second data to the external device.

8. The sending device according to claim 1, wherein the high dynamic range image data include first data and second data, and
the circuitry is further configured to:
send the first data to the external device as a first frame image; and
send the second data to the external device as a second frame image.

9. The sending device according to claim 1, wherein the high dynamic range image data include one of first data and second data or third data and fourth data,
the first data correspond to lower 8-bits of the plurality of bits associated with the high dynamic range image data,
the second data correspond to upper bits of the plurality of bits associated with the high dynamic range image data,
the third data correspond to upper 8-bits of the plurality of bits associated with the high dynamic range image data, and
the fourth data correspond to lower bits of the plurality of bits associated with the high dynamic range image data.

10. A method, comprising:
receiving first transmission scheme information for high dynamic range image data from an external device, wherein the external device is compatible with the first transmission scheme information;
selecting a transmission scheme, for transmission of the high dynamic range image data, from a plurality of transmission schemes based on the received first transmission scheme information, wherein
the transmission scheme corresponds to an arrangement of a plurality of bits associated with the high dynamic range image data, and
the transmission scheme causes least image deterioration among the plurality of transmission schemes;
sending the high dynamic range image data to the external device based on the selected transmission scheme; and
sending, to the external device, at least one of second transmission scheme information for the high dynamic range image data or gamma correction information for the high dynamic range image data.

11. A non-transitory computer-readable medium having stored thereon, computer-executable instructions, which when executed by a processor of a sending device, cause the sending device to execute operations, the operations comprising:
receiving first transmission scheme information for high dynamic range image data from an external device, wherein the external device is compatible with the first transmission scheme information;
selecting a transmission scheme, for transmission of the high dynamic range image data, from a plurality of transmission schemes based on the received first transmission scheme information, wherein
the transmission scheme corresponds to an arrangement of a plurality of bits associated with the high dynamic range image data, and
the transmission scheme causes least image deterioration among the plurality of transmission schemes;
sending the high dynamic range image data to the external device based on the selected transmission scheme; and
sending, to the external device, at least one of second transmission scheme information for the high dynamic range image data or first gamma correction information for the high dynamic range image data.

12. A receiving device, comprising:
a circuitry configured to:
send first transmission scheme information to an external device;
receive, from the external device, high dynamic range image data based on the sent first transmission scheme information;
receive, from the external device, at least one of first second transmission scheme information for the high dynamic range image data or first gamma correction information for the high dynamic range image data;
decode the received high dynamic range image data based on the at least one of the second transmission scheme information or the first gamma correction information; and
control a display screen to display a high dynamic range image based on the decoded high dynamic range image data.

13. The receiving device according to claim 12, wherein the circuitry is further configured to receive the high dynamic range image data from the external device by use of a differential signal.

14. The receiving device according to claim 13, wherein the circuitry is further configured to extract the at least one of the second transmission scheme information or the first gamma correction information from a blanking interval of the high dynamic range image data.

15. The receiving device according to claim 12, wherein the circuitry is further configured to:
store at least one of the first transmission scheme information for the high dynamic range image data or gamma correction scheme information for the high dynamic range image data,
wherein the receiving device is compatible with the first transmission scheme information and the gamma correction scheme information; and
send, to the external device, the at least one of the second transmission scheme information or the gamma correction scheme information.

16. The receiving device according to claim 15, wherein the circuitry is further configured to:
store third transmission scheme information for second gamma correction information for the high dynamic range image data; and
send, to the external device, the stored third transmission scheme information.

17. The receiving device according to claim 15, wherein the circuitry is further configured to store at least one of:
first information associated with a maximum luminance for the display,
second information associated with a maximum expansion luminance level for a high dynamic range process, or
an expansion process prohibition flag.

18. A method, comprising:
sending first transmission scheme information to an external device;
receiving high dynamic range image data from the external device based on the sent first transmission scheme information;
receiving, from the external device, at least one of second transmission scheme information for the high dynamic range image data or gamma correction information for the high dynamic range image data;
decoding the received high dynamic range image data based on the at least one of the second transmission scheme information or the gamma correction information; and
controlling a display screen to display a high dynamic range image based on the decoded high dynamic range image data.

19. A non-transitory computer-readable medium having stored thereon, computer-executable instructions, which when executed by a processor of a receiving device, cause the receiving device to execute operations, the operations comprising:
sending first transmission scheme information to an external device;
receiving, from the external device, high dynamic range image data based on the sent first transmission scheme information;
receiving, from the external device, at least one of second transmission scheme information for the high dynamic range image data or gamma correction information for the high dynamic range image data;
decoding the received high dynamic range image data based on the at least one of the second transmission scheme information or the gamma correction information; and
controlling a display screen to display a high dynamic range image based on the decoded high dynamic range image data.

* * * * *

UNITED STATES PATENT AND TRADEMARK OFFICE
CERTIFICATE OF CORRECTION

| | |
|---|---|
| PATENT NO. | : 10,623,805 B2 |
| APPLICATION NO. | : 15/523398 |
| DATED | : April 14, 2020 |
| INVENTOR(S) | : Yasuhisa Nakajima |

It is certified that error appears in the above-identified patent and that said Letters Patent is hereby corrected as shown below:

In the Specification

Column 21, Line 4, --in a sixth bit of a sixth byte-- should be --in a sixth bit of a seventh byte--

In the Claims

Column 37, Lines 8 and 9, --receive, from the external device, at least one of first second transmission scheme information-- should be --receive, from the external device, at least one of second transmission scheme information--

Signed and Sealed this
Eleventh Day of October, 2022

Katherine Kelly Vidal
*Director of the United States Patent and Trademark Office*